United States Patent
Kozak et al.

(10) Patent No.: US 12,526,390 B2
(45) Date of Patent: *Jan. 13, 2026

(54) OPTIMIZING DRIVE SCHEMES FOR MULTIPLE PROJECTOR SYSTEMS

(71) Applicant: BARCO VISUAL SOLUTIONS, INC., Vancouver (CA)

(72) Inventors: Eric Kozak, Burnaby (CA); Gerwin Damberg, Vancouver (CA); Anders Ballestad, Vancouver (CA); Raveen Kumaran, Burnaby (CA); James Gregson, Vancouver (CA); Johannes Minor, Vancouver (CA); Gil Rosenfeld, Vancouver (CA)

(73) Assignee: BARCO VISUAL SOLUTIONS, INC., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,932

(22) Filed: Dec. 22, 2023

(65) Prior Publication Data
US 2024/0244163 A1    Jul. 18, 2024

Related U.S. Application Data

(63) Continuation of application No. 17/839,418, filed on Jun. 13, 2022, now Pat. No. 12,160,689, which is a
(Continued)

(51) Int. Cl.
*H04N 9/31* (2006.01)
*G02B 27/48* (2006.01)
(Continued)

(52) U.S. Cl.
CPC .......... *H04N 9/3147* (2013.01); *G02B 27/48* (2013.01); *G03B 21/26* (2013.01); *G03B 35/20* (2013.01);
(Continued)

(58) Field of Classification Search
CPC .............. H04N 9/3147; H04N 9/3126; H04N 9/3161; H04N 9/3164; H04N 9/3182;
(Continued)

(56) References Cited

U.S. PATENT DOCUMENTS

| 956,000 A | 4/1910 | Teich |
|---|---|---|
| 5,287,096 A | 2/1994 | Thompson et al. |

(Continued)

FOREIGN PATENT DOCUMENTS

| CA | 2088497 A1 | 2/1992 |
|---|---|---|
| CA | 2443494 A1 | 3/2005 |

(Continued)

OTHER PUBLICATIONS

Communication pursuant to Article 94(3) EPC issued in European Patent Application No. 14854627.8, Dec. 6, 2019. 5 pages.
(Continued)

*Primary Examiner* — Sherrie Hsia
(74) *Attorney, Agent, or Firm* — HSML P.C.

(57) ABSTRACT

Light projection systems and methods may comprise combining light from two or more projectors. Each projector may be controlled so that the combined light output of the projectors matches a target for the projected light. In some embodiments optimization is performed to generate image data and control signals for each of the projectors. Embodiments may be applied in image projecting applications, lighting applications, and 3D stereoscopic imaging.

12 Claims, 19 Drawing Sheets

Related U.S. Application Data continuation of application No. 16/228,669, filed on Dec. 20, 2018, now Pat. No. 11,363,242, which is a continuation of application No. 15/359,427, filed on Nov. 22, 2016, now Pat. No. 10,171,779, which is a continuation of application No. 15/312,165, filed as application No. PCT/CA2015/000324 on May 15, 2015, now abandoned.

(60) Provisional application No. 61/994,002, filed on May 15, 2014, provisional application No. 62/148,041, filed on Apr. 15, 2015.

(51) Int. Cl.
- G03B 21/26 (2006.01)
- G03B 35/20 (2021.01)
- H04N 13/332 (2018.01)
- H04N 13/363 (2018.01)
- G03B 21/00 (2006.01)

(52) U.S. Cl.
CPC ......... *H04N 9/3126* (2013.01); *H04N 9/3155* (2013.01); *H04N 9/3161* (2013.01); *H04N 9/3164* (2013.01); *H04N 9/3182* (2013.01); *H04N 9/3188* (2013.01); *H04N 9/3194* (2013.01); *H04N 13/332* (2018.05); *H04N 13/363* (2018.05); *G03B 21/005* (2013.01); *G03B 2206/00* (2013.01)

(58) Field of Classification Search
CPC .. H04N 9/3188; H04N 9/3194; H04N 13/332; H04N 13/363; H04N 5/74; G02B 27/48; G03B 21/26; G03B 21/005; G03B 35/20; G03B 2206/00
USPC ....................................................... 348/744
See application file for complete search history.

(56) References Cited

U.S. PATENT DOCUMENTS

| | | | |
|---|---|---|---|
| 5,490,009 A | 2/1996 | Venkateswar et al. | |
| 5,597,223 A * | 1/1997 | Watanabe | G02B 26/0833 |
| | | | 353/101 |
| 5,886,675 A * | 3/1999 | Aye | G03H 1/26 |
| | | | 348/51 |
| 5,953,469 A | 9/1999 | Zhou | |
| 5,956,000 A | 9/1999 | Kreitman et al. | |
| 5,978,142 A * | 11/1999 | Blackham | H04N 9/3126 |
| | | | 348/E5.119 |
| 6,057,537 A | 5/2000 | Schubert et al. | |
| 6,115,022 A * | 9/2000 | Mayer, III | H04N 9/12 |
| | | | 345/611 |
| 6,222,593 B1 | 4/2001 | Higurashi et al. | |
| 6,406,148 B1 | 6/2002 | Marshall et al. | |
| 6,417,892 B1 * | 7/2002 | Sharp | H04N 9/3126 |
| | | | 348/E5.133 |
| 6,456,339 B1 | 9/2002 | Surati et al. | |
| 6,490,364 B2 * | 12/2002 | Hanna | H04N 13/243 |
| | | | 348/E13.016 |
| 6,568,816 B2 | 5/2003 | Mayer et al. | |
| 6,570,623 B1 | 5/2003 | Li et al. | |
| 6,733,138 B2 | 5/2004 | Raskar | |
| 6,760,075 B2 | 7/2004 | Mayer et al. | |
| 6,771,272 B2 | 8/2004 | Deering | |
| 6,804,406 B1 | 10/2004 | Chen | |
| 6,814,448 B2 | 11/2004 | Ioka | |
| 7,108,379 B2 | 9/2006 | Tan | |
| 7,118,226 B2 | 10/2006 | Davis et al. | |
| 7,440,160 B2 | 10/2008 | Heckmeier et al. | |
| 7,712,902 B2 * | 5/2010 | Nakamura | G03B 21/2053 |
| | | | 353/30 |
| 8,330,870 B2 | 12/2012 | Marcus et al. | |
| 8,339,695 B2 | 12/2012 | Haussler et al. | |
| 8,534,868 B2 | 9/2013 | Salters et al. | |
| 8,547,641 B2 | 10/2013 | Copolla | |
| 8,749,463 B2 | 6/2014 | Matsumoto et al. | |
| 9,874,319 B2 | 1/2018 | Minor et al. | |
| 10,171,779 B2 | 1/2019 | Kozak et al. | |
| 10,324,361 B2 | 6/2019 | Damberg et al. | |
| 10,404,957 B2 | 9/2019 | Damberg et al. | |
| 10,408,390 B2 | 9/2019 | Minor et al. | |
| 10,477,170 B2 | 11/2019 | Damberg et al. | |
| 10,531,055 B2 | 1/2020 | Richards et al. | |
| 11,363,242 B2 | 6/2022 | Kozak et al. | |
| 2003/0019854 A1 | 1/2003 | Gross et al. | |
| 2003/0197669 A1 | 10/2003 | Marshall | |
| 2003/0218590 A1 | 11/2003 | Kiser | |
| 2004/0104902 A1 | 6/2004 | Fujii et al. | |
| 2004/0169823 A1 * | 9/2004 | Bridgwater | H04N 9/3126 |
| | | | 353/30 |
| 2004/0239885 A1 | 12/2004 | Jaynes et al. | |
| 2005/0018309 A1 | 1/2005 | McGuire et al. | |
| 2005/0058175 A1 | 3/2005 | Gross et al. | |
| 2005/0111072 A1 * | 5/2005 | Miyagaki | G02B 5/3016 |
| | | | 359/279 |
| 2005/0195223 A1 * | 9/2005 | Nitta | H04N 9/3126 |
| | | | 345/690 |
| 2006/0072075 A1 * | 4/2006 | De Vaan | H04N 5/74 |
| | | | 353/30 |
| 2006/0158405 A1 | 7/2006 | Willis | |
| 2006/0202930 A1 | 9/2006 | Uchiyama et al. | |
| 2006/0215130 A1 * | 9/2006 | Nakamura | H04N 9/3167 |
| | | | 353/97 |
| 2007/0046898 A1 * | 3/2007 | Conner | H04N 9/3155 |
| | | | 353/31 |
| 2007/0091277 A1 * | 4/2007 | Damera-Venkata | |
| | | | G03B 21/005 |
| | | | 353/69 |
| 2007/0103768 A1 * | 5/2007 | Blackham | H04N 9/3164 |
| | | | 348/E9.027 |
| 2007/0268224 A1 | 11/2007 | Whitehead et al. | |
| 2007/0273957 A1 * | 11/2007 | Zalevsky | G02B 19/0014 |
| | | | 359/566 |
| 2008/0036872 A1 | 2/2008 | Nobori | |
| 2008/0049044 A1 * | 2/2008 | Nitta | H04N 9/3182 |
| | | | 345/634 |
| 2008/0204847 A1 * | 8/2008 | Kamm | G02B 27/48 |
| | | | 348/E9.026 |
| 2008/0266321 A1 | 10/2008 | Aufranc et al. | |
| 2008/0278689 A1 * | 11/2008 | Read | H04N 13/363 |
| | | | 353/38 |
| 2009/0001272 A1 | 1/2009 | Hajjar | |
| 2009/0002297 A1 | 1/2009 | Sakai et al. | |
| 2009/0002787 A1 | 1/2009 | Cable et al. | |
| 2009/0040133 A1 * | 2/2009 | Clodfelter | H04N 9/3147 |
| | | | 345/204 |
| 2009/0116520 A1 | 5/2009 | Oozeki | |
| 2009/0128875 A1 | 5/2009 | Christmas et al. | |
| 2009/0141242 A1 | 6/2009 | Silverstein et al. | |
| 2009/0190103 A1 | 7/2009 | Takahashi et al. | |
| 2009/0225234 A1 | 9/2009 | Ward et al. | |
| 2009/0225395 A1 * | 9/2009 | Ganti | G02B 26/001 |
| | | | 359/291 |
| 2010/0007577 A1 * | 1/2010 | Ninan | H04N 9/3126 |
| | | | 345/1.3 |
| 2010/0141855 A1 | 6/2010 | Wynn | |
| 2010/0149313 A1 | 6/2010 | Kroll et al. | |
| 2010/0208327 A1 | 8/2010 | Sandstrom | |
| 2011/0018911 A1 | 1/2011 | Kitaoka et al. | |
| 2011/0019112 A1 | 1/2011 | Dolgoff | |
| 2011/0037953 A1 | 2/2011 | Nizani et al. | |
| 2011/0101253 A1 | 5/2011 | Lal et al. | |
| 2011/0122467 A1 | 5/2011 | Futterer et al. | |
| 2012/0001834 A1 | 1/2012 | Hudman et al. | |
| 2012/0032999 A1 | 2/2012 | Seetzen | |
| 2012/0200476 A1 | 8/2012 | Kanamori et al. | |
| 2012/0229430 A1 | 9/2012 | Ward et al. | |
| 2013/0015367 A1 | 1/2013 | Cui | |
| 2013/0038838 A1 | 2/2013 | Ferri | |
| 2013/0070320 A1 | 3/2013 | Holmes | |

(56) References Cited

U.S. PATENT DOCUMENTS

| | | | |
|---|---|---|---|
| 2013/0077308 A1 | 3/2013 | Svensen et al. | |
| 2013/0162952 A1* | 6/2013 | Lippey | H04N 9/3161 353/121 |
| 2013/0170007 A1 | 7/2013 | Kurashige et al. | |
| 2013/0182322 A1 | 7/2013 | Silverstein | |
| 2013/0201403 A1* | 8/2013 | Iversen | H04N 9/3105 348/659 |
| 2013/0214688 A1 | 8/2013 | Chapman et al. | |
| 2013/0215012 A1 | 8/2013 | Reddy et al. | |
| 2013/0250049 A1 | 9/2013 | Schwerdtner | |
| 2013/0265622 A1 | 10/2013 | Christmas et al. | |
| 2014/0002514 A1 | 1/2014 | Richards | |
| 2014/0029858 A1* | 1/2014 | Tung | G09G 3/3466 382/218 |
| 2014/0035919 A1* | 2/2014 | Majumder | G09G 3/007 345/428 |
| 2014/0043352 A1* | 2/2014 | Damberg | G03H 1/16 345/589 |
| 2014/0055692 A1 | 2/2014 | Kroll et al. | |
| 2014/0268330 A1* | 9/2014 | Perkins | G03B 21/2053 359/629 |
| 2015/0042895 A1 | 2/2015 | Jannard et al. | |
| 2015/0172610 A1* | 6/2015 | Candry | H04N 9/3155 353/85 |
| 2016/0284260 A1 | 9/2016 | Mizuno | |
| 2016/0381329 A1 | 12/2016 | Damberg et al. | |
| 2017/0078629 A1 | 3/2017 | Kozak et al. | |
| 2017/0085846 A1 | 3/2017 | Damberg et al. | |
| 2017/0127025 A1 | 5/2017 | Damberg et al. | |
| 2017/0150107 A1 | 5/2017 | Kozak et al. | |
| 2017/0192224 A1 | 7/2017 | Logiudice et al. | |
| 2018/0373129 A1 | 12/2018 | Pertierra et al. | |
| 2018/0376115 A1 | 12/2018 | Damberg et al. | |
| 2019/0124304 A1 | 4/2019 | Kozak et al. | |
| 2020/0004115 A1 | 1/2020 | Kyosuna et al. | |

FOREIGN PATENT DOCUMENTS

| | | |
|---|---|---|
| CA | 2884903 C | 9/2015 |
| CA | 2956844 A1 | 2/2016 |
| CN | 101295123 A | 10/2008 |
| CN | 102053371 A | 5/2011 |
| CN | 103325129 A | 9/2013 |
| CN | 103477640 B | 9/2016 |
| CN | 106662753 A | 5/2017 |
| DE | 102005021155 B3 | 11/2006 |
| DE | 102009028626 A1 | 1/2011 |
| EP | 1363460 A2 | 11/2003 |
| EP | 0927379 A4 | 12/2005 |
| EP | 1098536 B1 | 8/2010 |
| EP | 3180652 A4 | 4/2018 |
| GB | 2398130 A | 8/2004 |
| GB | 2482066 A | 1/2012 |
| GB | 2485609 A | 5/2012 |
| GB | 2499579 A | 8/2013 |
| JP | H06242509 A | 9/1994 |
| JP | H095881 A | 1/1997 |
| JP | H11337871 A | 12/1999 |
| JP | 2003125317 A | 4/2003 |
| JP | 2007033576 A | 2/2007 |
| JP | 2007033577 A | 2/2007 |
| JP | 2007532893 A | 11/2007 |
| JP | 2008015064 A | 1/2008 |
| JP | 2008089686 A | 4/2008 |
| JP | 2008197386 A | 8/2008 |
| JP | 2009042372 A | 2/2009 |
| JP | 2009180821 A | 8/2009 |
| JP | 2010529484 A | 8/2010 |
| JP | 2010533889 A | 10/2010 |
| JP | 2011502274 A | 1/2011 |
| JP | 2011514546 A | 5/2011 |
| JP | 2011227324 A | 11/2011 |
| JP | 2012237814 A | 12/2012 |
| JP | 2013015599 A | 1/2013 |
| JP | 5287121 B2 | 9/2013 |
| JP | 2014513316 A | 5/2014 |
| JP | 2014517337 A | 7/2014 |
| JP | 2014518400 A | 7/2014 |
| JP | 2015510150 A | 4/2015 |
| JP | 2017527111 A | 9/2017 |
| WO | 0125848 A2 | 4/2001 |
| WO | 2001025848 A2 | 4/2001 |
| WO | 2004046805 A1 | 6/2004 |
| WO | 2006116536 A1 | 11/2006 |
| WO | 2008013368 A1 | 1/2008 |
| WO | 2008049917 A1 | 5/2008 |
| WO | 2008075096 A1 | 6/2008 |
| WO | 2009089211 A1 | 7/2009 |
| WO | 2009126263 A1 | 10/2009 |
| WO | 2010125367 A1 | 11/2010 |
| WO | 2010149587 A2 | 12/2010 |
| WO | 2011061914 A1 | 5/2011 |
| WO | 2011071701 A1 | 6/2011 |
| WO | 2012021567 A2 | 2/2012 |
| WO | 2012125736 A2 | 9/2012 |
| WO | 2012145200 A1 | 10/2012 |
| WO | 2012151262 A1 | 11/2012 |
| WO | 2012166536 A1 | 12/2012 |
| WO | 2012166682 A2 | 12/2012 |
| WO | 2013029667 A1 | 3/2013 |
| WO | 2013117903 A1 | 8/2013 |
| WO | 2013117923 A1 | 8/2013 |
| WO | 2013130037 A1 | 9/2013 |
| WO | 2015054797 A1 | 4/2015 |
| WO | 2015172236 A1 | 11/2015 |
| WO | 2015184549 A1 | 12/2015 |
| WO | 2016015163 A1 | 2/2016 |
| WO | 2016023133 A1 | 2/2016 |

OTHER PUBLICATIONS

Examination Report issued in European Application No. 14854627.8; mailed Dec. 13, 2018., 5 pages.
Hoskinson et al. "Light Reallocation for Higr1 Contrast Project; on Using an Analog Micromirror Array," ACM Siggraph conference proceedings, Dec. 15, 2010, 10 pages.
International Search Report and Written Opinion issued in PCT Patent Application No. PCT/CA2014/051013, mailed Jan. 30, 2015, 11 pages.
International Search Report and Written Opinion issued in PCT Patent Application No. PCT/CA2015/050778, dated Nov. 24, 2015, 10 pages.
Office Action issued in Japanese Application No. 2016-525963; mailed Nov. 9, 2018; 10 pages.
Schwartzburg, Y. et al."High-Contrast Computational Caustic Design", ACM Transactions on Graphics, ACM, US vol. 33, No. 4, Jul. 27, 2014, 11 pages.
Communication pursuant to Article 94(3) EPC issued in European Patent Application No. 15827729.3, mailed Dec. 17, 2019, 8 pages.
Extended European Search Report issued in European Patent Application No. 15827729.3, mailed Feb. 20, 2018, 13 pages.
Communication pursuant to Article 94(3) issued in European Patent Application 16852940.2, mailed Mar. 26, 2021, 6 pages.
Communication pursuant to Article 94(3) EPC issued in European Patent Application 15792616.3, mailed Feb. 2, 2021, 9 pages.
The Extended European Search Report issued in European Patent Application 16852940.2, mailed May 9, 2019, 8 pages.
Extended European Search Report issued in European Patent Application 15792616.3, mailed Dec. 7, 2017, 11 pages.
Murdoch, Michael J. et al. "Veiling Glare and Perceived Black in High Dynamic Range Displays," Journal of the Optical Society of America, vol. 29, No. 4, p. 559, Apr. 1, 2012, 17 pages.
Extended European Search Report issued in European Patent Application 21214505.6, mailed May 9, 2022, 9 pages.

* cited by examiner

OPTIMIZING DRIVE SCHEMES FOR MULTIPLE PROJECTOR SYSTEMS

CROSS-REFERENCE TO RELATED APPLICATIONS

This application is a continuation of U.S. application Ser. No. 17/839,418 filled Jun. 13, 2022, which is a continuation of United States application Ser. No. 16/228,669 filed Dec. 20, 2018, which is a continuation of U.S. application Ser. No. 15/359,427 filed Nov. 22, 2016, which is a continuation of U.S. application Ser. No. 15/312,165. U.S. application Ser. No. 15/312,165 is the US National Stage of PCT Application No. PCT/CA2015/000324 filed 15 May 2015, which claims priority from U.S. Application No. 61/994,002 filed 15 May 2014 and U.S. Patent Application No. 62/148,041 filed 15 Apr. 2015. For purposes of the United States, this application claims the benefit under 35 U.S.C. § 119 of U.S. Application No. 61/994,002 filed 15 May 2014 entitled BRIGHTNESS BOOSTER FOR MULTIPLE-STAGE PROJECTORS and U.S. Patent Application No. 62/148,041 filed 15 Apr. 2015 entitled OPTIMIZING DRIVE SCHEMES FOR MULTIPLE PROJECTOR SYSTEMS, all of which are hereby incorporated herein by reference for all purposes.

FIELD

This invention relates to image projectors and methods for projecting images. The invention has application, for example, in cinema projection, projection television, advertising displays, general illumination such as spatially adaptive automotive headlights and the like.

BACKGROUND

Many light projectors have a light source that uniformly illuminates an image formation chip, such as a DMD, LCoS, LCD or reflective LCD (or film) that subtractively modulates the incoming light in order to create a target image. Such projectors typically 1) cannot exceed a peak luminance set by the optical power of the light source, the projected image size, and the reflectivity of the image screen, and 2) have a dynamic range or contrast that is limited by the image formation device, for example film, or digital devices like LCD, LCOs or DMD imaging chips.

Light projectors vary in their capability to produce target images with specified luminance and chromaticity values. The range of capabilities stem from technological limitations related to maximum peak luminance (optical output of the light source) to lowest black-level and hence contrast (contrast of the included image formation technology), to chromatic purity and colour gamut (governed either by the filters applied to a broadband source or to the wavelength of, for example, a laser light source), as well as uniformity and noise specifications. Some projectors can produce light output with limited contrast, for example reaching a peak luminance of 100 cd/m$^2$ and a black level of 1 cd/m$^2$, and hence a contrast of 100:1. Other projectors can reach brighter highlights (by increasing the light source power), and/or deeper black levels (using higher contrast image formation technology). In some systems, very deep black levels can be achieved by modulating the image twice ("dual modulation"). The contrast or dynamic range of a projector can be dynamically adjusted by inserting an iris or aperture in the light path, whose light blocking may be driven in response to image content.

The type of and requirements of image or video content to be reproduced on a projector can vary significantly in time over the course of a presentation of image or video content. The presentation could, for example, comprise presentation of a movie in a cinema, a live performance that uses projectors, or projection of light by adaptive (image-) projector headlights while driving in different conditions in a vehicle. For example a movie might begin with a dark, high contrast, black and white scene, and later contain bright and low contrast scenes with pure colors. While driving at night, an adaptive car headlight might be required to project a uniform, and low contrast light field on an empty road outside the city, but within the city be required to produce a very high contrast, bright image to highlight stop signs, avoid illuminating upcoming cars (casting a shadow in that region) or signaling information on the road.

High brightness, high dynamic range projectors are often more expensive than standard lower dynamic range projectors for similar average light (power) outputs. One reason for this is that achieving better black levels often requires more elements within the system (for example dual modulation designs that use cascaded, light attenuating elements). Another reason is that achieving higher peak luminance on the same screen requires more light-source power in the projector.

There remains a need for good ways to control a projection system to reproduce image content having characteristics that vary significantly over time (e.g. characteristics such as dynamic range, black level, maximum luminance, color saturation) as in the examples above. Such ways would beneficially provide advantages such as reducing power requirements, providing good black level, and/or providing bright highlights.

There remains a need for light projection systems that offer one or both of higher image quality and better cost efficiency.

There remains a need for practical and cost effective projection systems suitable for projecting patterns such as images, desired lamp illumination patterns, and the like. There is a particular need for such systems that are able to faithfully display content having characteristics that change significantly over time (e.g. systems called upon to display bright low-contrast images at some times and to display dark images with bright highlights at other times).

SUMMARY

This invention has a number of aspects. One aspect provides a projector system that combines a plurality of projectors. The projectors may have performance characteristics different from one another. The projectors may be separate devices or share certain components, such as control electronic or certain optical elements. Another aspect provides control hardware devices useful for coordinating the operation of two or more projectors to display an image. Another aspect provides a method for splitting an incoming image signal into separate images.

Multiple image generating devices may be used to form a combined image. Each device has a set of operating specifications (which may include, for example, specifications such as peak luminance, resolution, black level, contrast, chromatic extent or gamut). Defined mathematical functions provide image quality and cost metrics in a mathematical framework that permits optimization to achieve goals such as improved image quality or lower cost. The results of the optimization yield separate image data for each image generating device.

This concept can be applied to projectors, where two or more systems with similar or different capabilities produce a combined image in accordance with image data.

In cases where a low dynamic range projector is present in an installation or a high dynamic range projector of suitable maximum output power cannot be found, it may be desirable to combine two or more projectors with similar or different capabilities in order to create a single image with high peak luminance and low black levels. An example of such an arrangement comprises a low dynamic range projector and a high dynamic range projector to create a single image with high peak luminance and low black levels.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

One motivation for combining two or more low dynamic range projectors (projector tiling), or even two low peak luminance, high contrast (dynamic range) projectors, is to boost the overall luminance (brightness) on screen of the resulting image. Low dynamic range projectors are common and a commodity technology and thus command a much lower purchase price than high dynamic range projectors of similar total output brightness.

Figure 1:
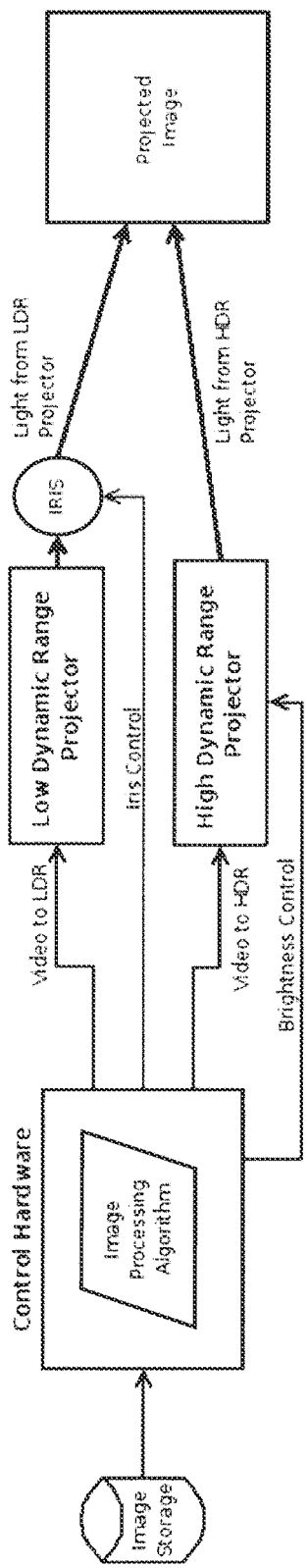
FIG. 1 is a block diagram showing a projection system according to an example embodiment.

FIG. 1 schematically illustrates a projector system comprising a plurality of projectors.

In some embodiments, all of the plurality of projectors contribute light to the same viewing area (e.g. boundaries of the fields of view of the projectors may be the same). Each of the plurality of projectors may deliver light to any part of the viewing area. Viewers perceive the combined output of the projectors. In some embodiments, each of the projectors projects onto the full display area of the viewing screen.

In a system where a low and high dynamic range projector (LDR and HDR) are combined, the optimal ratio of light contributed by each of the projectors to the final image can vary greatly. This variation is a result of image and environmental properties such as:
- ambient light level at the screen location
- image peak luminance
- image average luminance
- light output of both projectors
- efficiency of both projectors (lumens/watt)
- minimum black level of LDR projector
- amount of black in the image
- proximity of black to bright features (veiling luminance)
- the presence of non-uniformity (or other artifacts) in the LDR projector that can be corrected by the HDR projector
- the presence of speckle (or other artifacts) in the HDR projector that can be reduced through use of the LDR projector
- ability to reduce power consumption of the projectors by showing dimmer content (for power consumption optimization)

Below are five example cases showing how images from a HDR projector and a LDR projector can be combined according to an example embodiment of the invention. "Bright" and "dim" refer to the luminance level of the image.

Case 1: Bright Low Dynamic Range Image, Elevated Black Levels

Figure 2A:
FIG. 2A is an example image.

The image (FIG. 2A) has a high black level. Darker details are surrounded closely by white features. In this example case the desired brightness of the image exceeds the capability of the LDR projector.

Figure 2B:
FIG. 2B and FIG. 2C are respectively images projected by an LDR projector and an HDR projector that may be combined to reproduce the image of FIG. 2A.
Figure 2C:
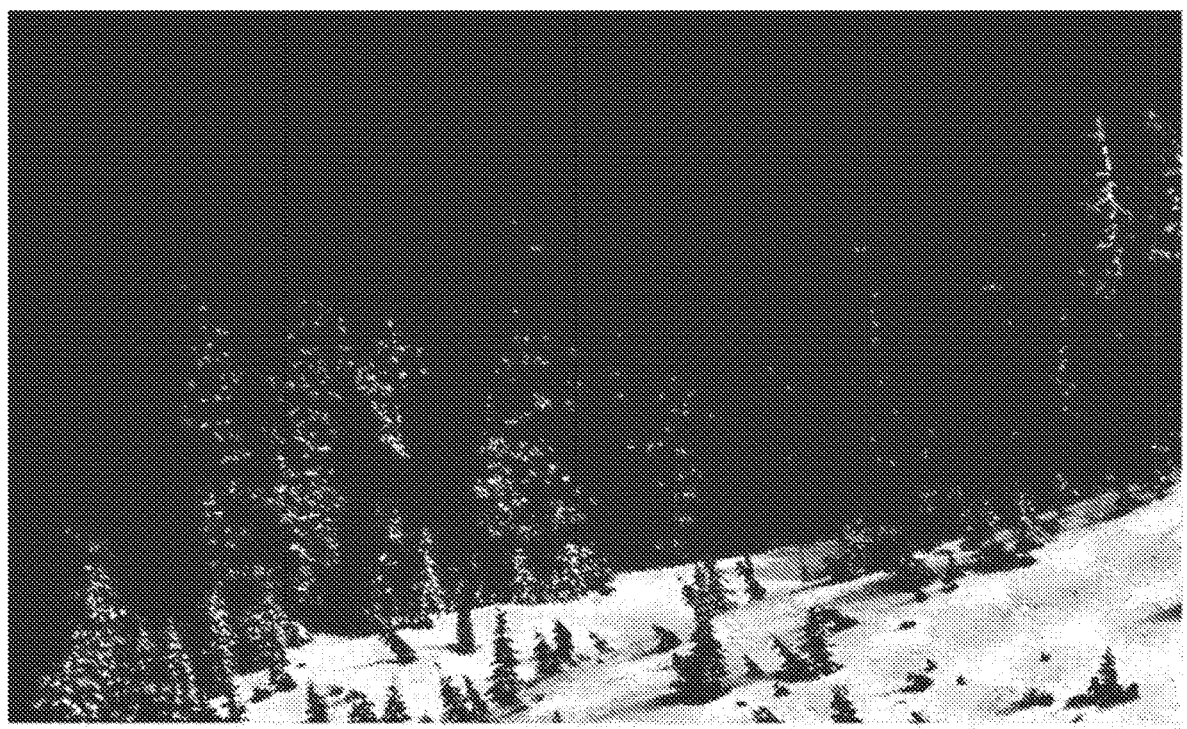

The LDR projector may be controlled to output as much light as it can (see FIG. 2B) and the HDR projector may be controlled to supplement some of the brighter features to simply increase the overall brightness of the image as shown in FIG. 2C.

Case 2: Dim Low Dynamic Range Image, High Blacks

Figure 3A:
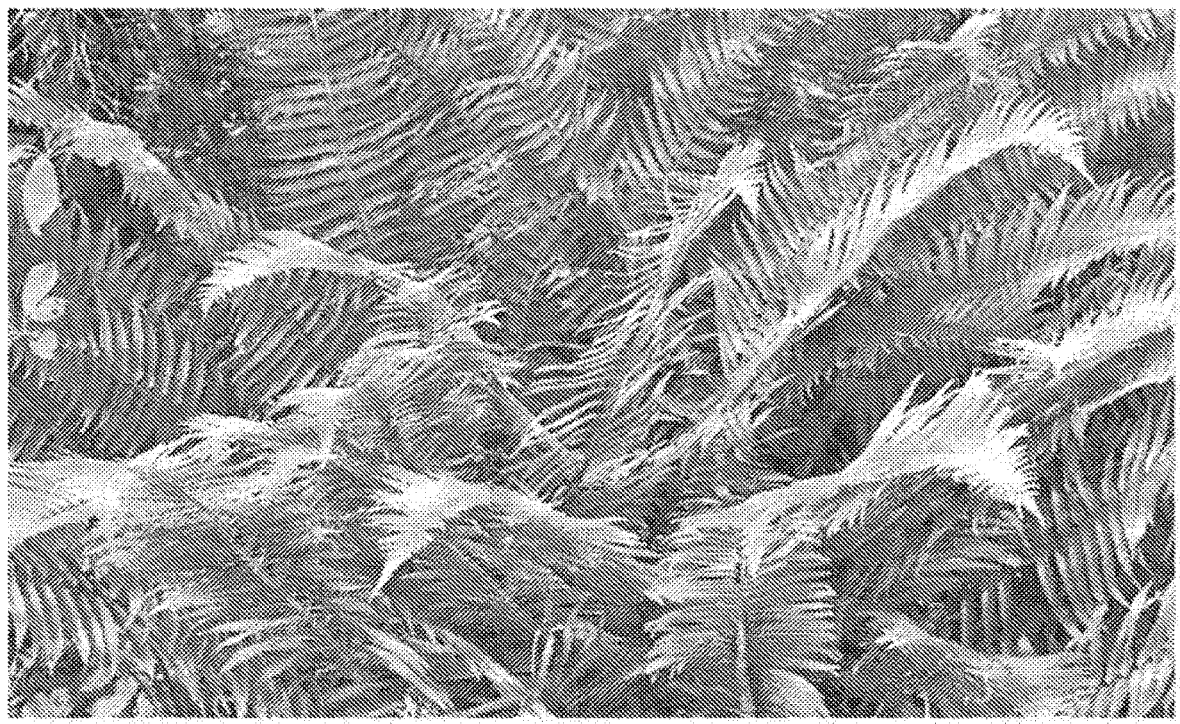
FIG. 3A is another example image.
Figure 3B:
FIG. 3B and FIG. 3C are respectively images projected by an LDR projector and an HDR projector that may be combined to reproduce the image of FIG. 3A.
Figure 3C:
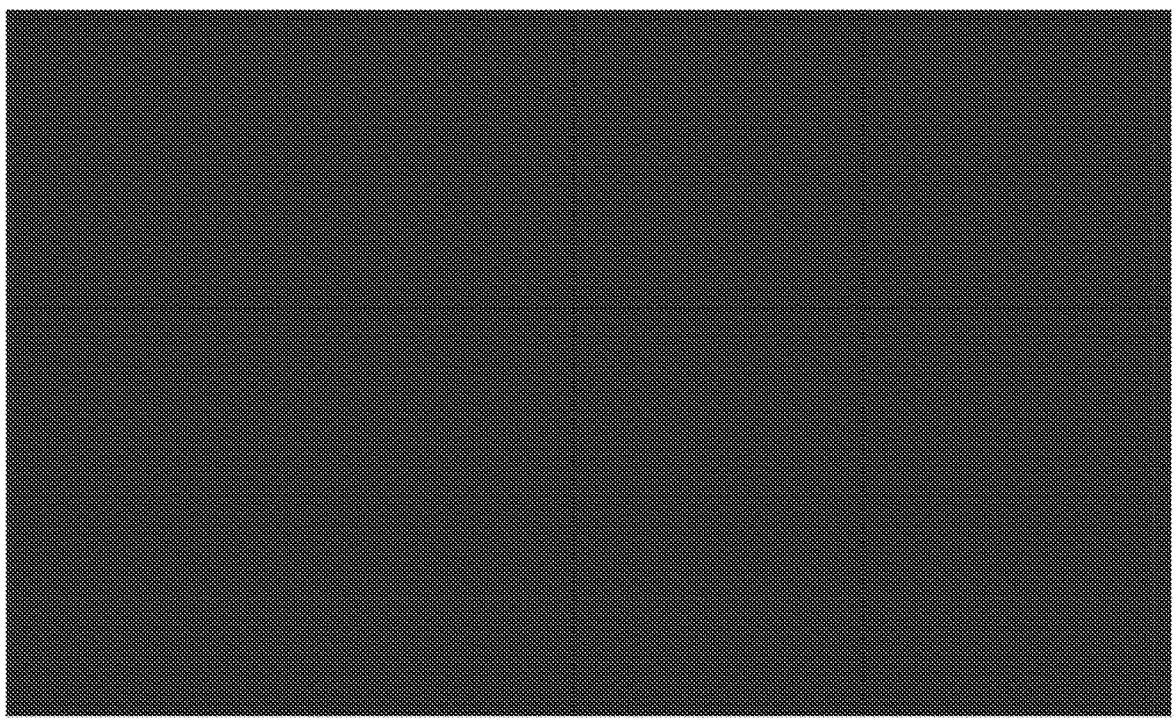

This image (FIG. 3A) does not have very high dynamic range. The LDR projector is sufficiently bright to produce the image at the desired level. In this case the LDR projector may simply show the input image "as is" (FIG. 3B) and the HDR projector may output nothing or be off (FIG. 3C).

Case 3: Bright High Dynamic Range Image, High Blacks

Figure 4A:
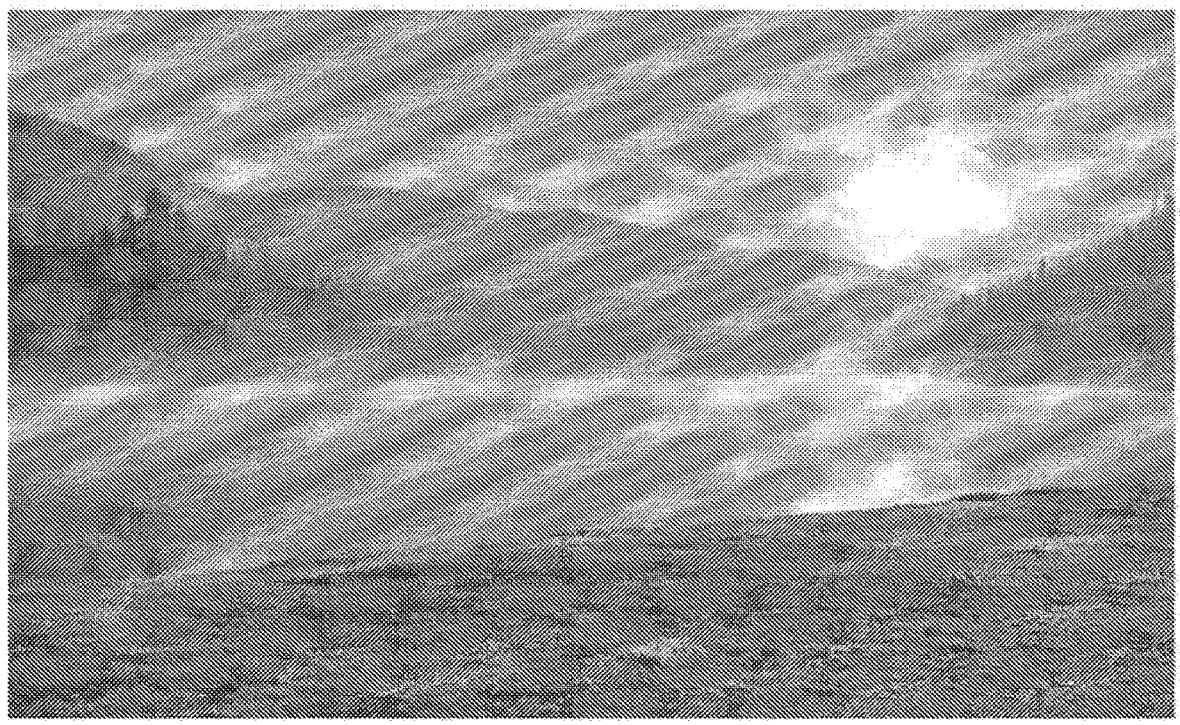
FIG. 4A is another example image.
Figure 4B:
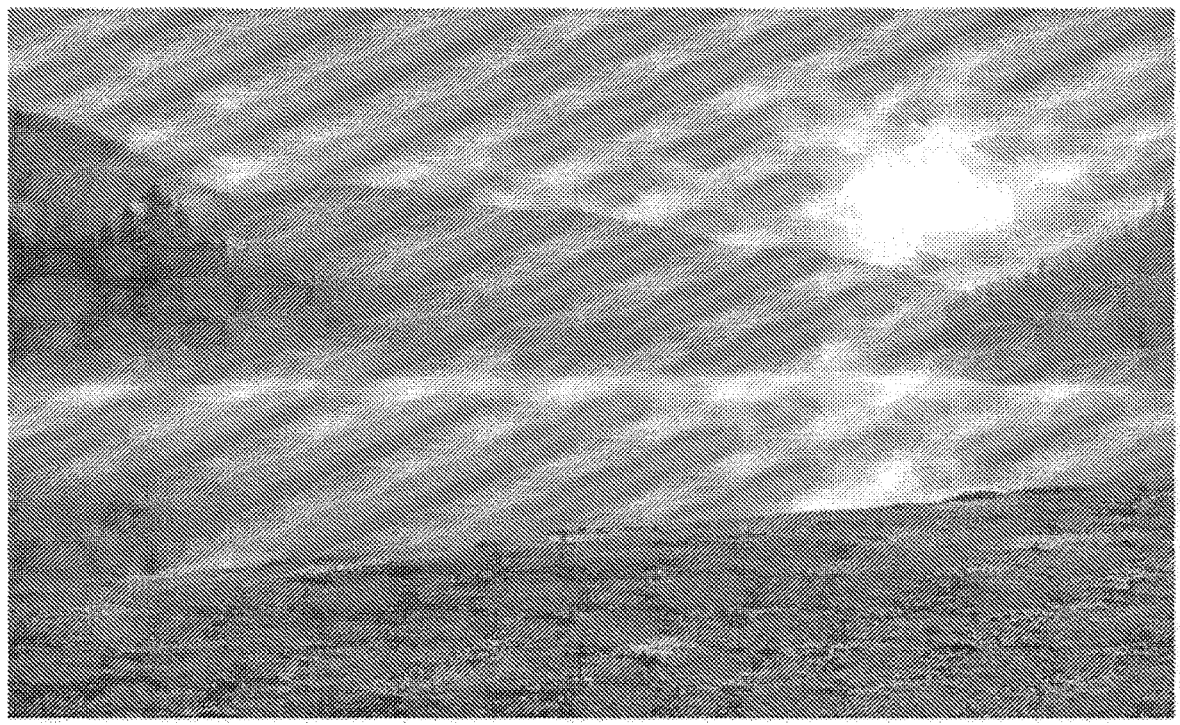
FIG. 4B and FIG. 4C are respectively images projected by an LDR projector and an HDR projector that may be combined to reproduce the image of FIG. 4A.
Figure 4C:
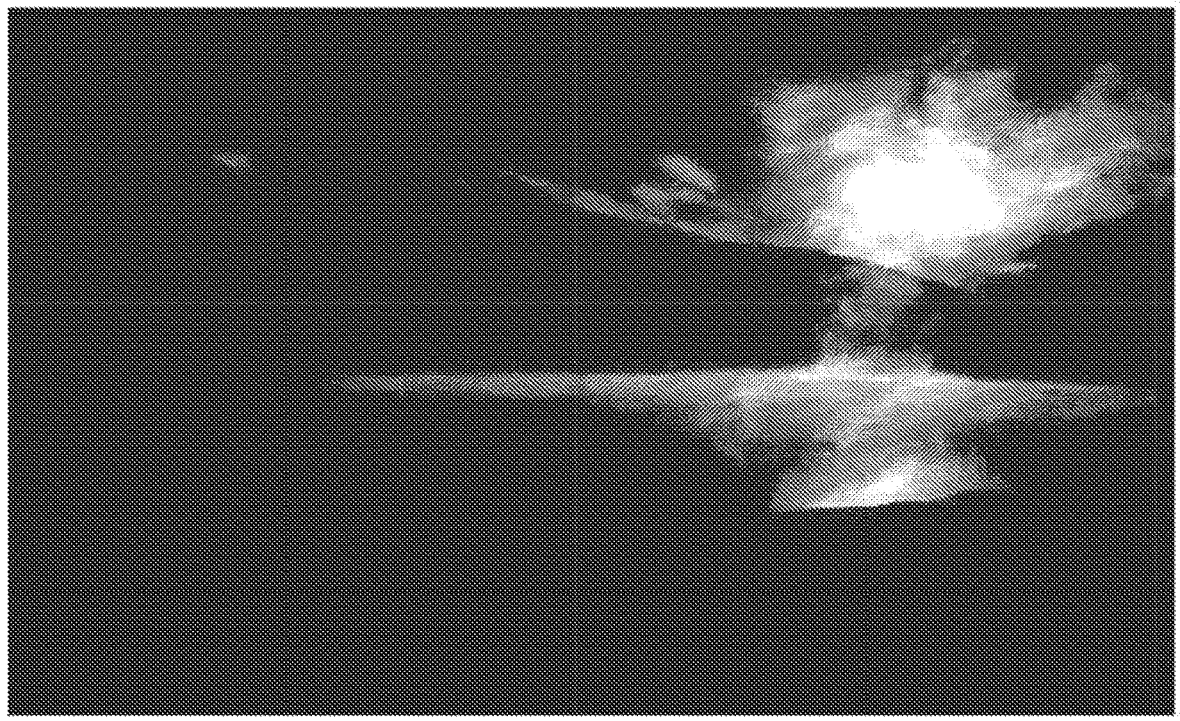

This image (FIG. 4A) shows some detail in the darker areas so the image does not have a very low black level. Brighter parts of the image exceed the brightness capability of the LDR projector. The LDR projector may display an image as shown in FIG. 4B and the HDR projector may display an image as shown in FIG. 4C.

Case 4: Bright High Dynamic Range Image, Low Blacks

Figure 5A:
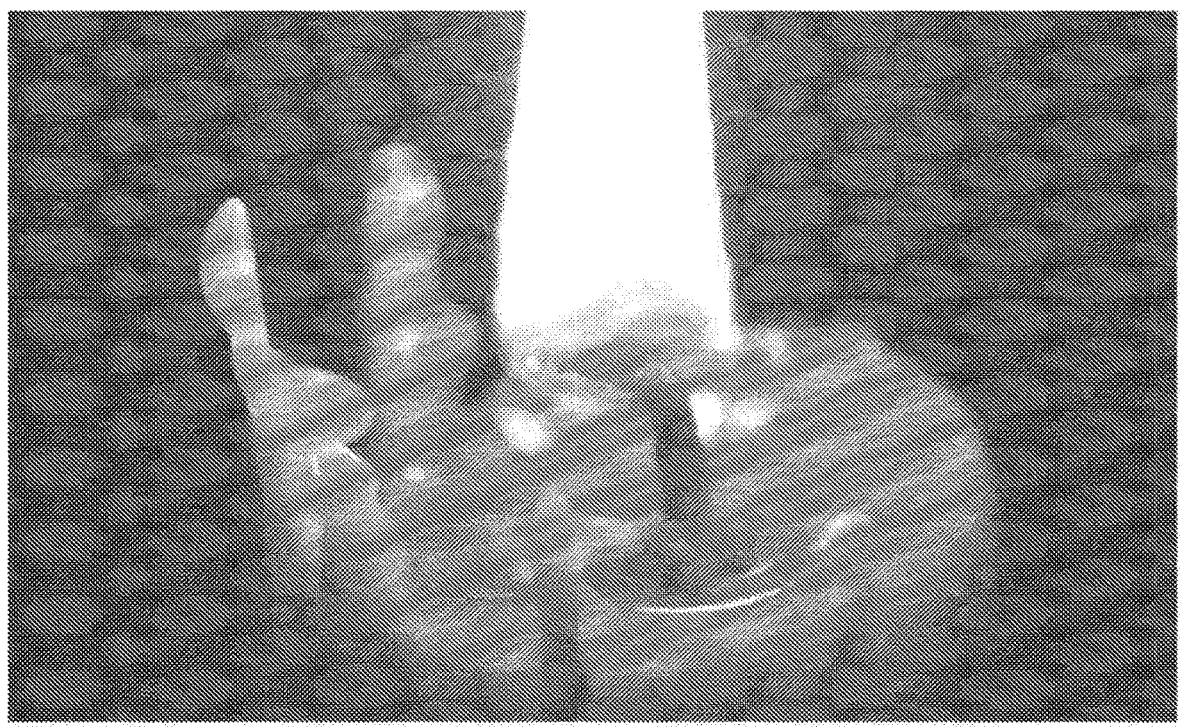
FIG. 5A is another example image.
Figure 5B:
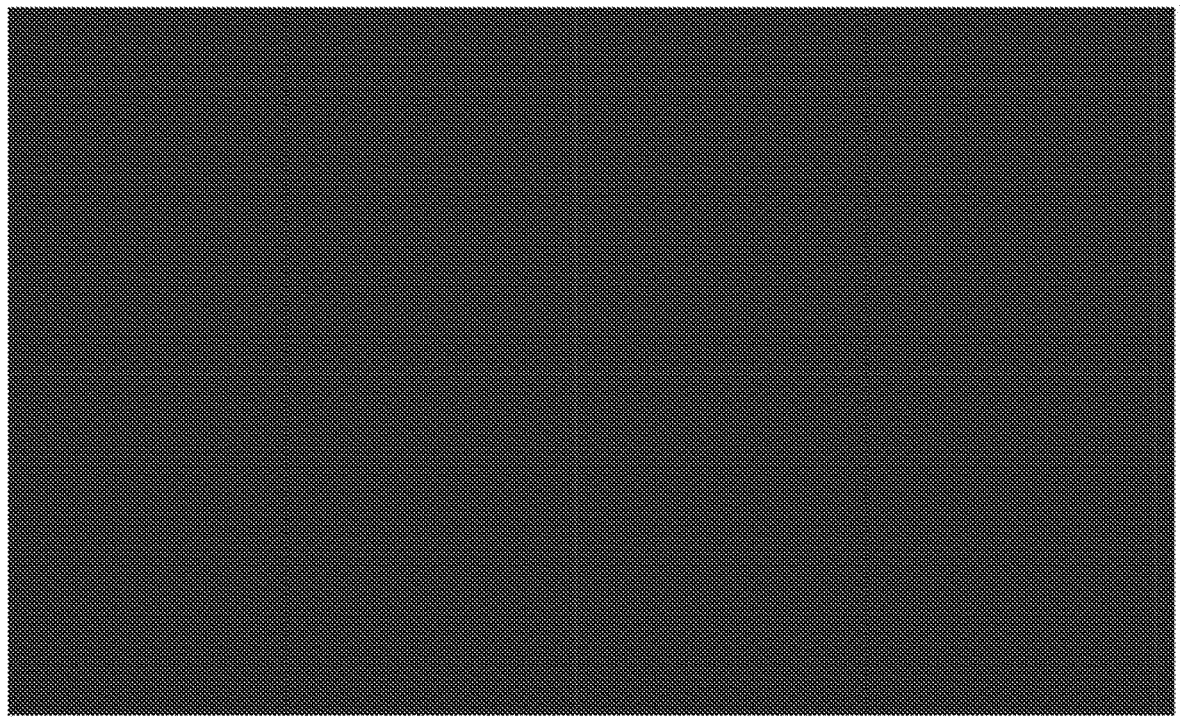
FIG. 5B and FIG. 5C are respectively images projected by an LDR projector and an HDR projector that may be combined to reproduce the image of FIG. 5A.
Figure 5C:
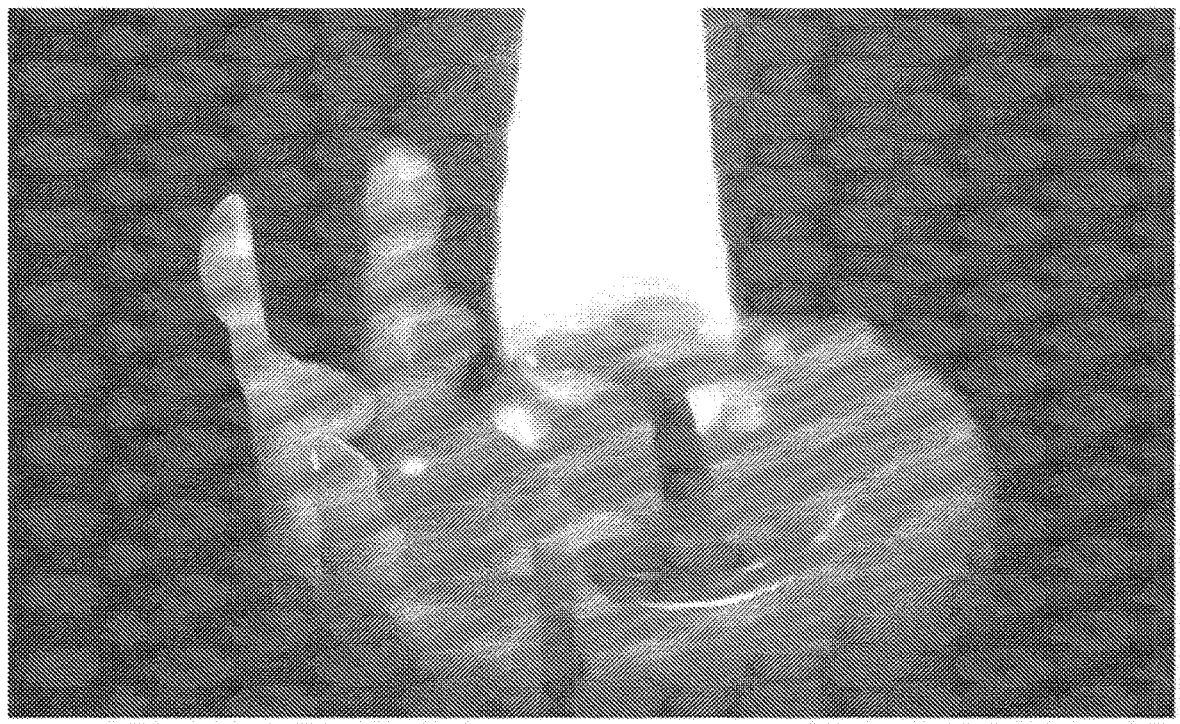

This image (FIG. 5A) has very low back levels with complete absence of detail in the darks. Due to the high expected brightness of the candle flame, the LDR projector may be turned off altogether, or dimmed down by the use of an iris (FIG. 5B), and the HDR projector may produce the entire image (FIG. 5C).

Case 5: Dim Low Dynamic Range Image, Low Blacks

Figure 6A:
FIG. 6A is another example image.
Figure 6B:
FIG. 6B and FIG. 6C are respectively images projected by an LDR projector and an HDR projector that may be combined to reproduce the image of FIG. 6A.
Figure 6C:
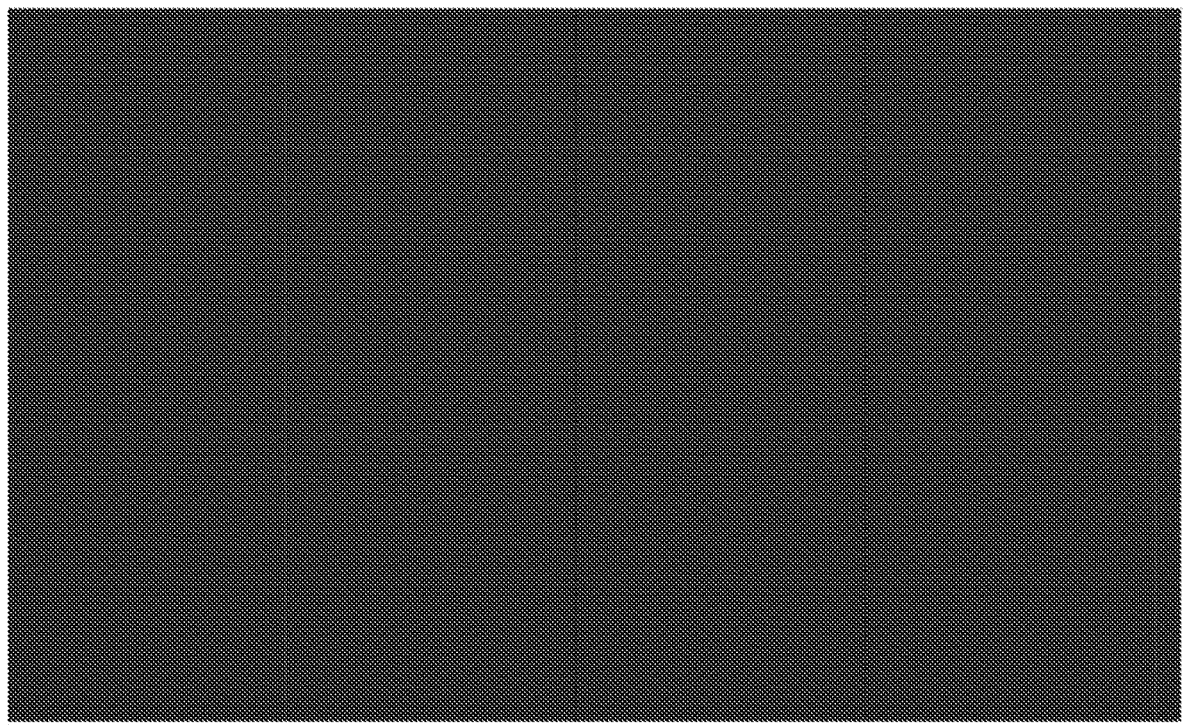

Here the peak brightness of the image is quite low (see FIG. 6A) and at the same time the black levels are also very low. The LDR projector would need an Iris over the lens (detailed below) to get the black levels down sufficiently. In this case the peak brightness through the partially closed Iris would be sufficient to display the image so the HDR projector would not be needed. FIG. 6B shows the image output by the LDR projector with an iris partially closed. FIG. 6C shows the (black/null) output of the HDR projector.

Iris/Global Lamp Power Control

Low dynamic range projectors often produce a dark grey image when attempting to show black due to limitations of light-modulator technology. As an example, consider images in which the brightest areas have luminances lower than the peak luminance of the projector. Here, better contrast can be achieved by dimming the light source. In another example, the amount of detail in dark areas of a target image can be determined to be of higher perceptual importance to the viewer. In such cases, bright content may be sacrificed by dimming the projector to regain deeper black levels. Most low dynamic range projectors are lamp based and cannot easily be dimmed or turned on and off (to create pure black) on a per scene basis due to warm-up issues.

In cases where a low dynamic range projector needs to be turned "off" or simply down, an iris can be placed in the optical path (e.g. over the lens). The iris may then be made smaller to improve the black level of the projected image. Also note that the iris is not binary; an iris may be opened to a size dictated by the desired image black level. It is assumed that the iris can change size with sufficient speed as to not create a noticeable lag when changing scenes. The iris function may also be implemented by some other electrical or mechanical means such as an LCD plate (electrically dimmable) or a high speed shutter rapidly closing and opening.

If the LDR projector has a solid state light source that has a light output that can be controlled, an iris may not be needed. In such embodiments, the light source may be dimmed in an amount such that its light output is equivalent to the light that would have been available through a constricted iris.

A high dynamic range projector may optionally include a globally dimmable solid state light source and/or an iris.

Artifact Mitigation

It may be advantageous for image quality to never completely close the iris and accept a slightly higher black level. If a HDR projector shows poorer image quality due to field non-uniformity or other artifacts, having at least a base amount of light from the LDR projector can help to perceptually mitigate the artifacts.

If an LDR projector displays image artifacts such as vignetting or other non-uniformity, the HDR projector may be used to correct for the non-uniformity of the light field.

Projector Balancing Algorithm

Display Representation:

In order to determine settings for each component projector one can take the capabilities of each projector into account.

Previous approaches commonly model image formation as a simple pipeline where each component takes an input, operates upon it, and passes it to the next stage. This approach is effective for systems consisting of relatively few controllable elements, e.g. light sources, modulators or irises, coupled with relatively many passive optical components such as mirrors or lenses, however it is less desirable in more complex systems. Such systems may combine multiple displays (projectors) or feed the output of one display into subsequent displays. In this case, parameters for later stages of the pipeline can be adjusted in order to compensate for artifacts or performance limitations of earlier stages.

Figure 7:
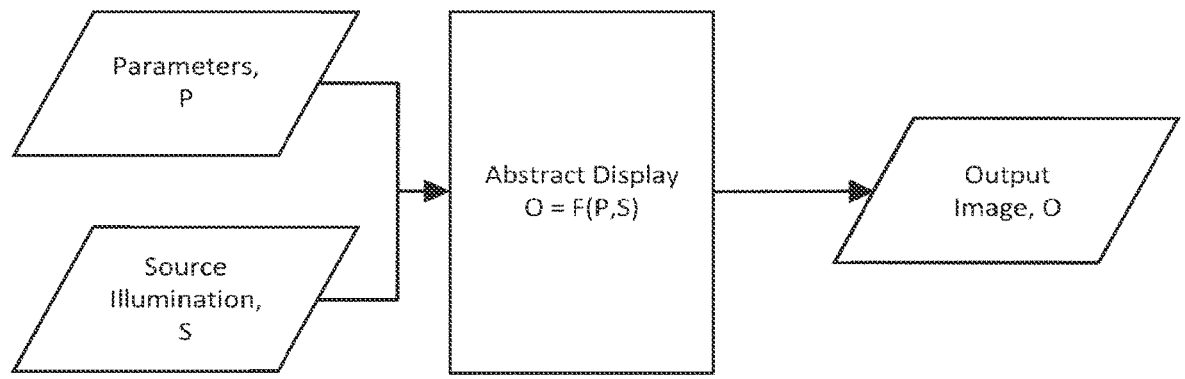
FIG. 7 is a schematic illustration of an abstract conception of a display.

It is advantageous to think of each display in an abstract sense as taking a set of display parameters, P (e.g. pixel values), and a source illumination, S, which are then operated upon by the display to produce an output image, O=F(P,S), where the function F models the operation of the specific display hardware. This abstract conception of a display is illustrated in FIG. 7.

This modular approach allows displays to be nearly arbitrarily connected to form networks of abstract displays and passive optical components to model more complex imaging systems. Displays in a network can be connected either in series to form a single optical path, or in parallel to combine multiple optical paths, or in a combination of serial and parallel designs.

Figure 8:
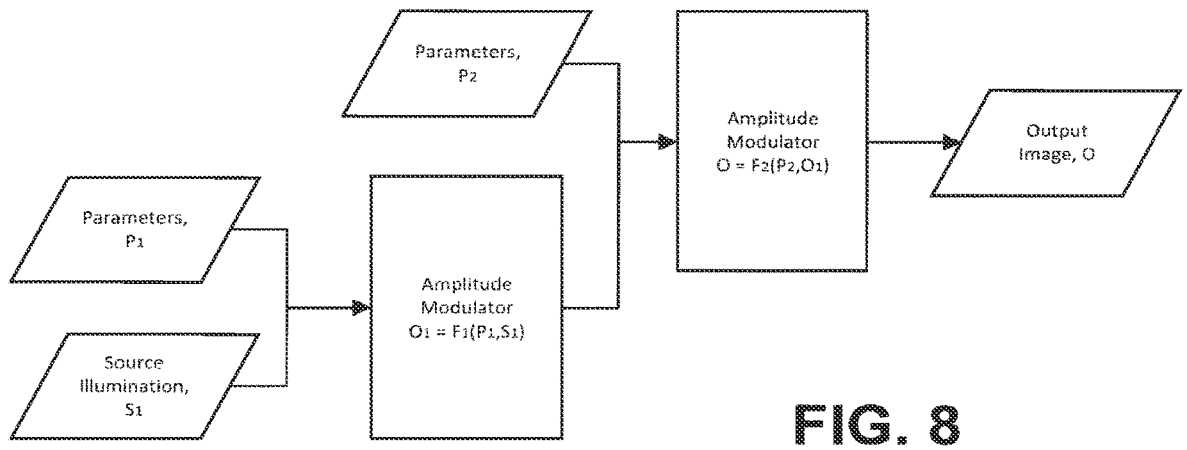
FIG. 8 illustrates two displays acting serially.

An example of a serial connection for two displays is shown in FIG. 8 for a system comprising two amplitude modulators connected in series. Such an arrangement is used in some Extended Dynamic Range (EDR) projectors which compensate for limited contrast ratios of individual amplitude modulators by cascading the modulators. The output contrast is consequently the product of the contrast ratios of the two modulators.

Figure 9:
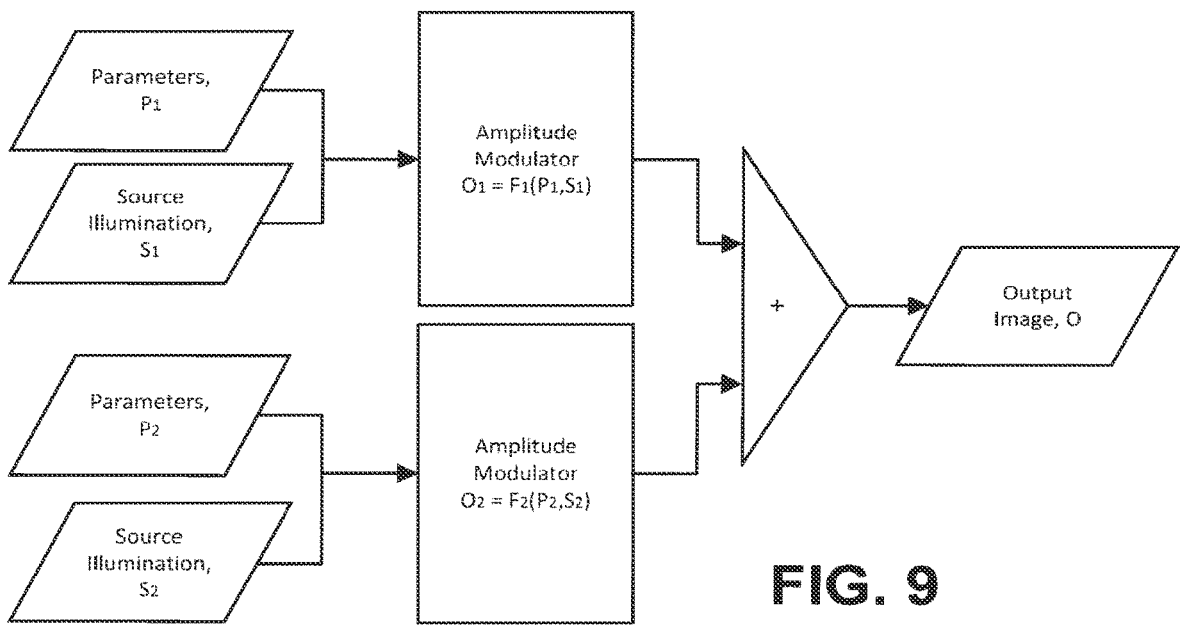
FIG. 9 illustrates two displays acting in parallel.

An example of a parallel arrangement is found in projector super-resolution applications, in which the output images from multiple projectors are overlapped with a slight deregistration in order to generate higher spatial frequency features than are present in an image from a single projector. This arrangement is shown in FIG. 9.

In the parallel arrangement, the optical paths of two amplitude modulating projectors are combined (by the projection screen) to produce an output image.

Based on the arrangement, the output image can be determined mathematically by either addition or composition of images generated by the component displays. Taking two displays with functions $F_1$ and $F_2$ taking parameters $P_1$ and $P_2$ respectively, a parallel configuration results in the following expression for the output image:

$$O = F_1(P_1, S_1) + F_2(P_2, S_2)$$

while a serial configuration results in the following expression:

$$O = F_2(F_1, (P_1, S_1), S_2)$$

Figure 10:
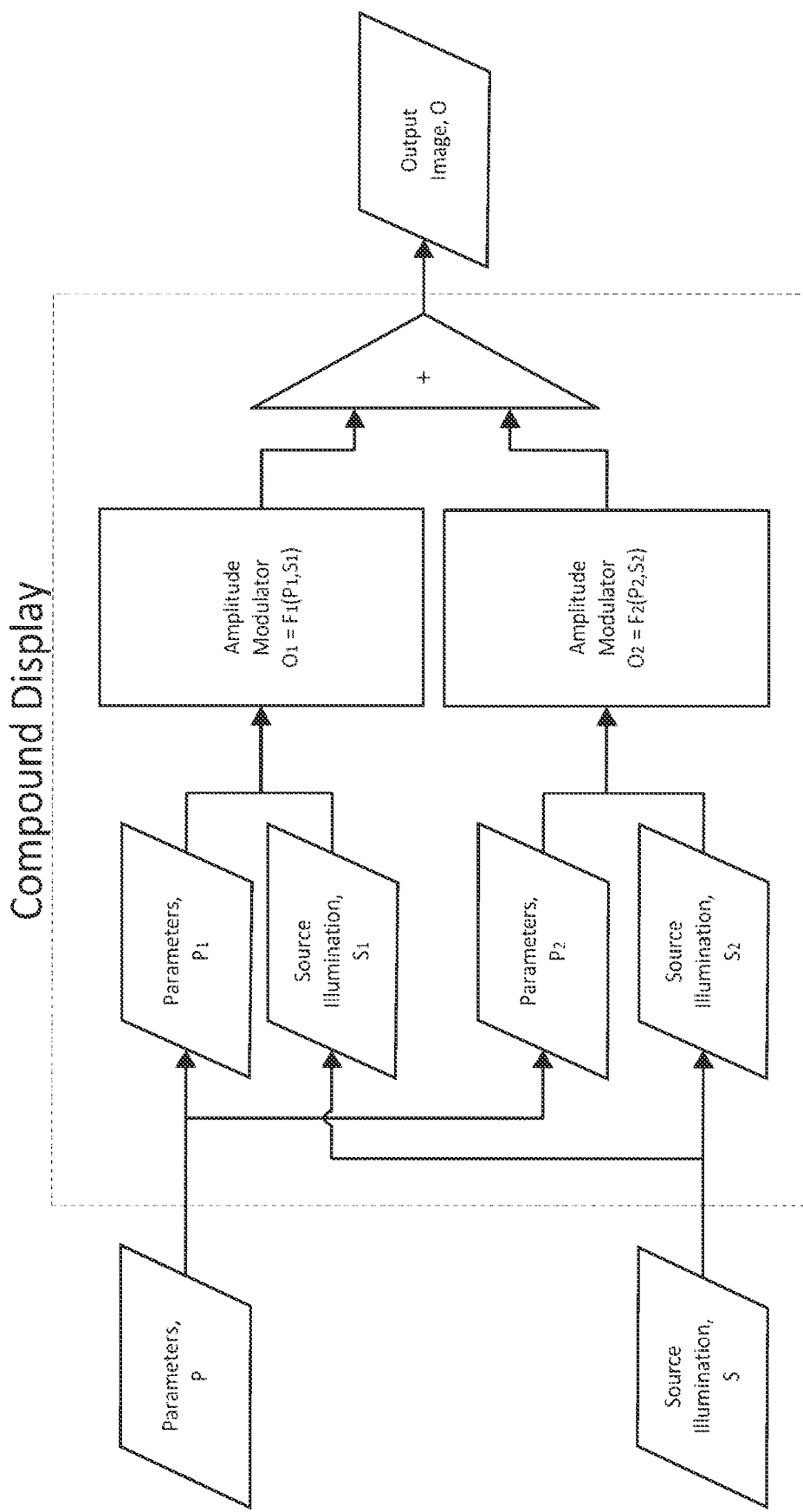
FIG. 10 is a block diagram illustrating an example compound display.

It is also possible to arrange arbitrarily many displays in a network to form compound displays by taking the union of the component display parameters and source illuminations as the inputs to the compound display. An example for a parallel configuration is shown in FIG. 10.

Compound displays can consequently be represented as specific types of abstract displays, which can in turn be arranged into networks and/or grouped to form higher level compound displays. Provided the component display image formation models, Fi, are known a mathematical image formation model of the overall display system can be expressed via combinations of the serial and parallel formulas. Such an image formation model may be applied to optimize the operation of a display system.

Display Parameter Optimization:

One benefit of this representation is that once the overall image formation model for the display system is defined, optimal parameters for individual displays can be obtained via numerical optimization. Such optimizations can incorporate multiple, sometimes conflicting, goals in order to balance desirable properties such as artifact mitigation, maximization of component display lifespans, total system efficiency, power consumption, and output image fidelity among many other options.

Figure 11:
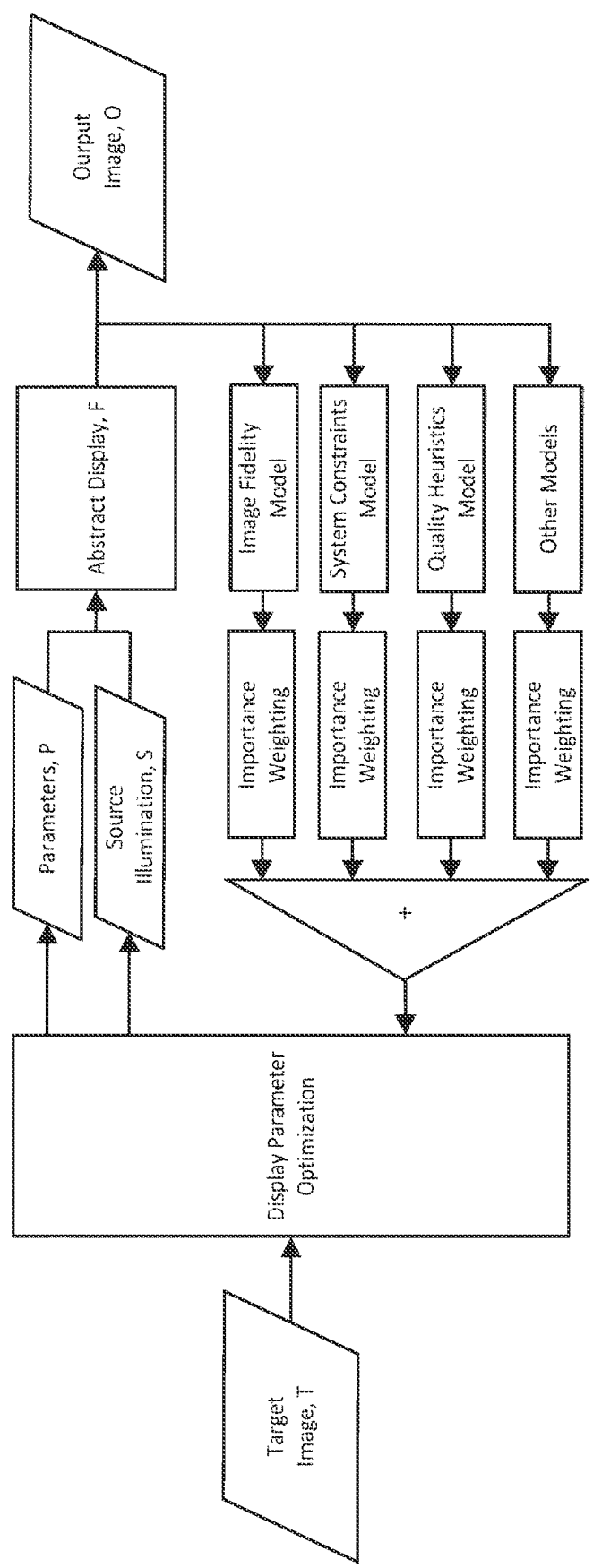
FIG. 11 is a block diagram illustrating a system in which display parameter optimization is performed to determine the parameters and illumination to be used to reproduce an input target image using a display.

Considering a display system as an abstract (possibly compound) display that takes parameters, P, and source illumination, S, to produce an output image can allow the parameters to be jointly optimized. Such a system is depicted in FIG. 11, in which display parameter optimization is performed to determine the parameters, P, and illumination, S, required to reproduce an input target image, T, for an abstract (possibly compound) display. The simulated (or measured) output of this display is then fed back through the system to several modules: an image fidelity model, a system constraint model and a quality heuristics model.

Although not explicitly labeled for diagram clarity, the models used by the system implicitly have access to target image, source illumination and current parameter selection. A camera located to acquire images showing the output of the display may also be incorporated into the feedback loop. In some embodiments, optimization is performed using a cost function that includes differences between images acquired by the camera and the desired output of the display system (a target image).

Each of the models attempts to correct for deviations of the output image or parameter selection from desirable properties. One common model is image fidelity: it is desirable that the image produced by the system closely approximate the target image, T, or a modified version of the target image, perhaps one where perceptual factors are taken into account. Errors between the output image and target image are used by the model to compute parameter adjustments. Optimization may proceed until either convergence of the parameters is achieved or a time budget is exhausted.

The system constraints model ensures that the parameter selection result in physically realizable (and desirable configurations). Such criteria can include requiring that source illumination profiles are within the available power or that parameters for modulators vary between opaque and transmissive, i.e. do not produce light. Desirable configurations may include choosing parameters that have spatial or temporal coherence, that are within a certain range (see e.g. the LCOS linearity discussion earlier), or parameters that minimize power usage and/or maximize component lifetime.

Image quality heuristics may be used to compensate for behaviors that are not easily modeled or which are costly to model for the image formation models. Image quality heuristics may include moiré, diffraction, temporal behavior and color fringing, among other artifacts. The heuristics models are intended to help compensate for these using empirical image-quality criteria. Image quality heuristics can also be provided to adjust parameters to optimize for properties of human perception, such as veiling luminance, adaptation levels, mean picture levels, metamerism and variations in sensitivity to chroma/luma errors. Sensitivity to these properties can be exploited in content generation.

Figure 12:
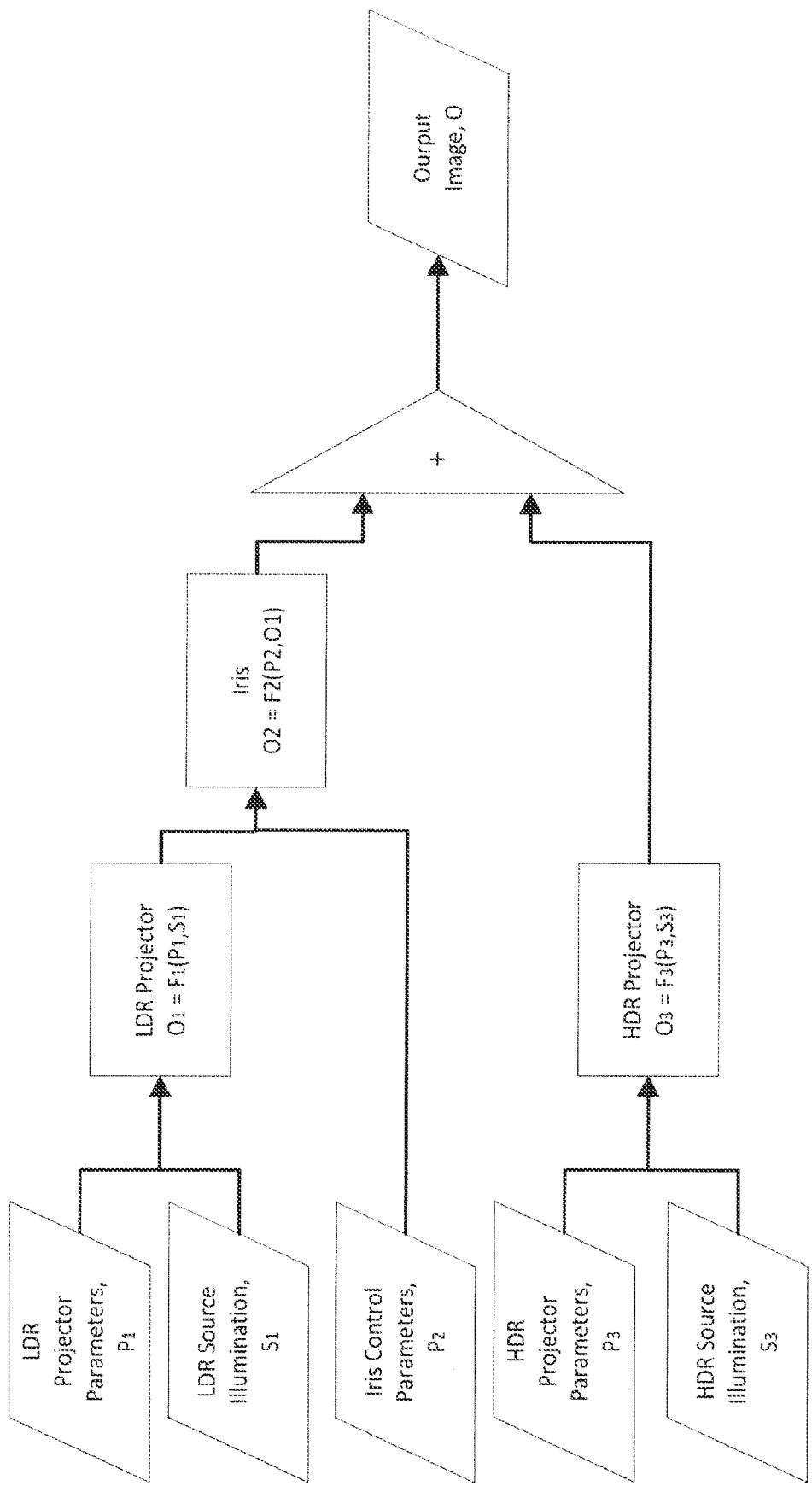
FIG. 12 is a flowchart illustrating the combination of images from first and second projectors to yield an output image.

FIG. 12 shows HDR+LDR projector systems depicted in the above-described abstract display framework.

The LDR and HDR projectors may themselves be compound displays. An example embodiment having desirable properties for commercial applications has a relatively high power LDR projector that can achieve a full-screen white suitable for typical average picture levels combined with a lower-power HDR projector that can achieve much higher peak brightness but does not have the power to do so over the entire screen. Such a system can be vastly more efficient and less costly than building a single projector capable of increased full-screen white values due to distributions of luminance in typical images. In such an embodiment, it is desirable to provide a control which permits global dimming of the LDR projector. Some example ways to provide such global dimming use an iris, a controllable shutter, and/or a variable output light source. The iris is a very simple display that modulates the intensity of the LDR projector, which could be replaced, in principle by a source, S1, for the LDR projector that can be dynamically modulated.

The display parameter optimization searches for LDR parameters P1, Iris/drive level parameters P2 and HDR parameters P3 causing the output image O to best match the target image T. The system of FIG. 12 then takes the place of the abstract display in the previous figure, with parameters P={P1, P2, P3} and S={S1, S3}. The output image as modeled by the image formation models is then:

$$O = F_2(P_2, F_1(P_1, S_1)) + F_3(P_3, S_3) = F(P, S)$$

Improved display parameters can be obtained via optimization. The optimization may comprise minimizing the sum of cost functions representing the image fidelity, image quality and system constraints, for example as follows:

$$P = \operatorname{argmin} \propto C(T - F(P, S)) + \sum_{i \in Q} \beta_i Q_i(P, S) \text{ subject to } K_j(P, S) = 0 \ \forall \ j$$

Here the image fidelity model is the function, C, which weights errors between the image produced by the system, F(P,S), to produce a scalar indicating how preferable the current set of parameters are. Common examples for C are the mean squared error (MSE) or the mean absolute error (MAE).

The functions $Q_i$ represent image quality heuristics/models which also produce scalar values indicating how preferable the current parameters are in terms of unmodeled artifacts, e.g. moiré, color fringing, or diffractions artifacts. The constants $\alpha$ and $\beta_i$ control the relative importance given to the various terms (which may be contradictory), providing a way for the content generation to favour one objective over another.

The constraints $K_j$ impose conditions on the parameters, for instance that modulators in projectors must operate in the range between fully transmissive and fully opaque. They are expressed here as set-valued constraints that are either satisfied ($K_j(P,S)=0$) or unsatisfied, however existing optimization techniques can relax these conditions to allow minor constraint violations.

Although not explicitly listed, the constraint functions, K, and image quality models, Q, may also have a dependence on the output image. O=F(P,S).

It is now possible to express several different schemes for partitioning image content between the LDR and HDR projectors. Several different examples are presented here:

Smooth Blends Between HDR and LDR Projector

Although the HDR projector is necessary for high luminance regions, it may be desirable, from an image quality perspective, to also make use of the HDR projector in regions below the full-screen white level of the LDR projector. This requires portioning content between the two projectors.

One straightforward way of approaching this is to blur or diffuse the mask used by the HDR projector, for example by blurring a dilated binary mask of pixels above the LDR projector full-screen white. A more sophisticated approach could compute approximations of the veiling luminance at each pixel in order to adjust blending parameters dynamically.

There are numerous other options for how to partition content between the component projectors. Examples of these options are discussed below:

1) Targeting luminance distributions in which there is a preferred ratio between the total LDR and HDR projector contributions (e.g. 95% and 5% respectively), for medium brightness scenes with high black-levels and highlights.
2) Targeting luminance distributions that favour use of the HDR projector while minimizing use of the LDR projector via dimmable sources or external irises. Such objectives can potentially reduce energy use and cooling requirements while also improving black-levels for dark scenes with bright highlights.
3) Targeting temporally consistent luminance distributions for one or both projectors in order to minimize temporal artifacts.
4) Reaching the absolutely widest dynamic range, highest peak luminance, or deepest black level of the combined display system in order to maximize perceived image quality.

With any of these approaches, the blending factors may be dynamically adjusted spatially within a scene to achieve desired local behaviour. For instance, low luminance content adjacent to high-luminance regions may be obscured by veiling luminance of highlights. In this case, neither of the LDR and HDR projectors need to display content for those regions. Alternatively, some scenes may have large bright regions and large dim regions. The adjustments discussed above can then be made, taking into account the scattering behavior of the projectors.

Extending Color Gamut

If the primary colours used in the HDR and LDR projectors differ, perhaps by design, it may be possible to extend the color gamut of the combined system. This can be achieved by mapping the target image to the appropriate color-space and determining what mixture of the two available sets of primaries best represents the target color, for instance choosing as broad a set of primaries as possible to improve metamerism. The process here is similar in principle to that used in extending the dynamic luminance range, as has been discussed throughout this document.

Super-Resolution

If the HDR and LDR projectors are deregistered, it may be possible to increase the apparent resolution of the combined system to decrease aliasing near edges. This can be achieved by optimizing for a high resolution target image, which will cause the projector contributions between HDR and LDR to automatically adjust in order to best approximate the high spatial frequency features.

Scatter Compensation & Feedback of Ambient Conditions

Scatter from the viewing environment can lead to dark image regions with elevated levels. Incorporating a heuristic scattering model for either the target or output image allows this to be taken into account in order to compensate for this effect. In this case the image formation model F could be represented as follows:

$$F(P, S) = F'(P, S) + R(P, S)$$

Here R is a function modeling scatter from the viewing environment and F' is the image formation model for the system in a non-scattering viewing environment. Parameters for the displays optimized using this image formation model automatically attempt to compensate for the resulting scatter.

A similar approach can use actual measurements of scattered light in place of the function R in order to dynamically compensate for light scattering from the viewing environment.

Figure 13:
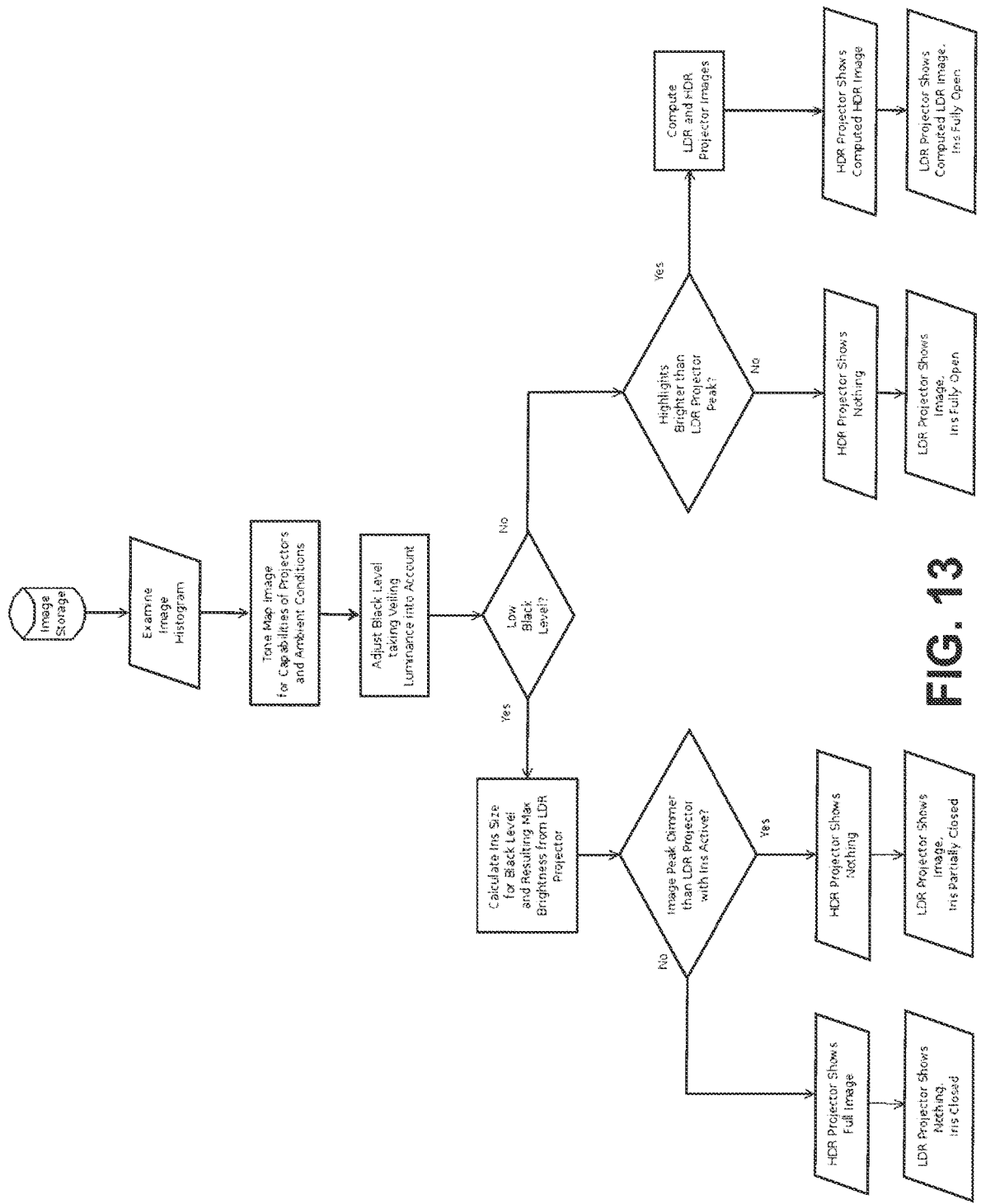
FIG. 13 is a flowchart illustrating a method for determining what image will be shown by each of a plurality of projectors to yield a target image.

The method illustrated in FIG. 13 details one approach to determining what image will be shown by what projector, and how they are computed.

The decision boxes depicted in FIG. 13 may incorporate a small amount of temporal hysteresis such that the LDR and HDR projectors will not bounce back and forth about a threshold from image to image.

The "Tone Map Image" operation examines the luminance levels (if available) in the incoming image and maps them to the capabilities of the combined LDR and HDR projector. This operation also takes in account the ambient light level when mapping the darker areas of the image, and the maximum overall luminance the observer would be comfortable with.

The "Adjust Black Level" operation will increase the black level of the mapped image in cases where the observer will not be able to perceive the lower black level. An example of this would be black text in a white field where veiling luminance would not allow an observer to distinguish a very low black level from a slightly elevated one. To achieve this, a forward model of the projectors may be used (to predict halo from brightness).

If an image still has a low black level after the above operations, an iris size (the amount of light attenuated by the iris or by dimming a light source) may be calculated to compensate for the elevated native black level of the LDR projector. Shrinking the iris will also lower the peak brightness available from the LDR projector. The reduced peak brightness may be computed as well.

If the LDR projector with its diminished iris size will not supply sufficient light to the image, the HDR projector may be used to generate the entire image. Note that as explained in the iris section above, it may be desired to never completely block all light from the LDR projector.

In the case where black levels are not low and the image contains highlights that cannot be shown using just the LDR projector due to insufficient brightness capabilities, a separate image for the LDR and the HDR projector may be computed. Since two images are being combined on screen in this case, care should be taken to "blend" them such that edge artifacts are not created when adjacent pixels are delivered from different projectors. The following approaches may be taken, either individually or in combination:

threshold banding (always summing pixels)
using different gamma curves for each projector
spatial variation (slight blur of one projector)
temporal dithering An example of threshold banding would be in the small pixel areas surrounding a bright feature. Here both projectors would contribute light and sum together to create the pixels. The size of this area can be calculated from the veiling luminance effect or simply a fixed number of pixels when there is a fairly soft transition between the highlight and the adjacent features (bright spot on a gradient).

Using a Brightness Booster for Multiple Stage Projection

Figure 14:
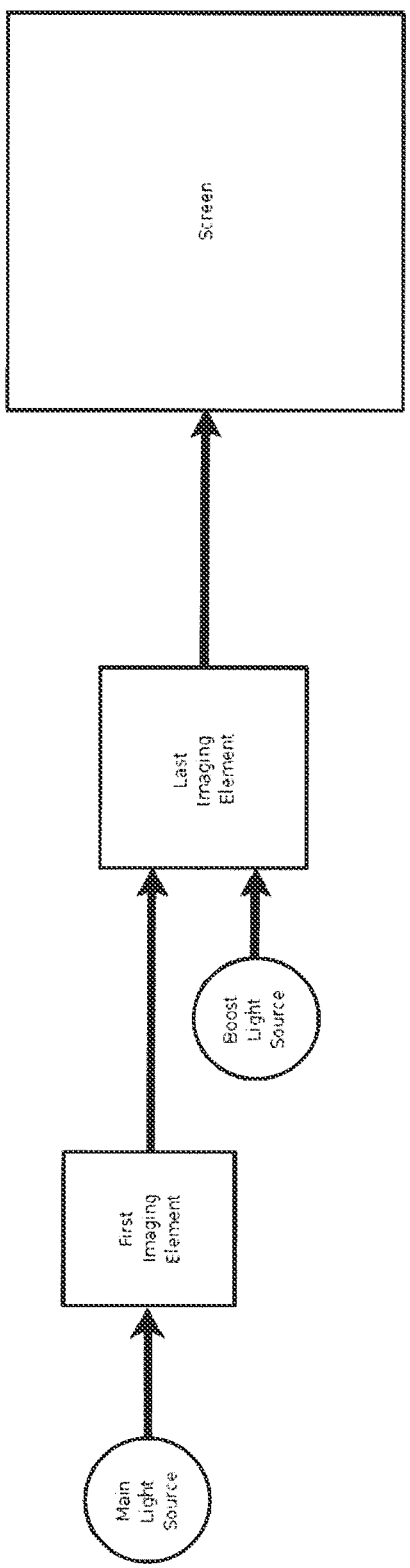
FIG. 14 is block diagram illustrating a projection system with a independent main and auxiliary light source ("boost light source") as well as two imaging elements that can steer or attenuate light onto a screen.

FIG. 14 schematically shows a projection system with two imaging elements in which an auxiliary booster light source is used when required to reproduce certain high brightness and/or low contrast images.

High dynamic range projectors use two or more imaging stages to lower black levels when generating images. Each one of these image stages has a loss associated with it so when creating very bright images there is far more light loss in a multi stage projector as compared with a single stage projector. Light can be added when required before the final imaging stage to boost the efficiency of the system when low black levels are not required.

Image forming elements used in the light path of projection systems are non-ideal in nature. When forming an image they allow light to leak through in dark areas and absorb some light in bright areas at the expense of overall contrast. To address this, projector manufacturers have made systems with multiple imaging elements to decrease the amount of light leaking through the system in dark areas. This in turn has required a much brighter light source to compensate for the transmission losses through two (or more) imaging elements in bright areas. These projectors show dramatically lower operational efficiency when showing bright images as compared with single stage projectors.

A projection system according to the example embodiment in FIG. 14 examines the nature of the image being projected and in the case of a low contrast high brightness image will add a calculated amount of uniform light before the final imaging stage. The added light will then only have to travel through a single imaging stage and thus incur far lower transmission losses. Thus, the operational efficiency of the system when producing bright images will be substantially increased. When producing images that require far less light and higher contrast, little or no light will be added before the last imaging elements to preserve the low black levels expected of a multiple stage system.

It is not mandatory that boost light delivered to the second imaging stage be uniform or even. In some embodiments the booster light is non-uniform. An example application of this is in the case where a first imaging stage provides a light output that includes undesired light patches or other artifacts. For example where the first stage is a light steering stage the first stage may provide static artifacts that are not steerable (for example a global roll-off of intensity towards the edges, or visible patches and stripes from different laser diodes that for one reason or another are not corrected for). In such cases the booster light may be structured in such a way that the sum of the booster light and the artifacts is uniform or near uniform illumination. This may be done by providing a non-uniform pattern of booster light inverse to the pattern of artifacts from the first stage.

FIG. 14 shows a "main light source" and a "boost light source". The light output of both light sources may be controlled in an independent fashion. The "main light source" is expected to illuminate the first imaging element in an even, or otherwise defined manner. The "boost light source" is expected to illuminate the last imaging element.

The purpose of the first imaging element is to block light or steer light away from darker parts of the image such that the last imaging element will not have to block much light from darker parts of the image being projected, leading to a high contrast image when desired. The first imaging element may, for example, modulate the phase and/or intensity of light from the main light source.

The "last imaging element" can be paired such that the boost light source has its own independent light path to the screen. This may be desirable in a very high power system when a single final stage imaging element may not be able to handle the thermal stress or intensity associated with both light paths being summed on its surface.

In a color projector the methods can be implemented separately for each color primary in the system or operated in a color field sequential manner on one or more example implementations.

Figure 15:
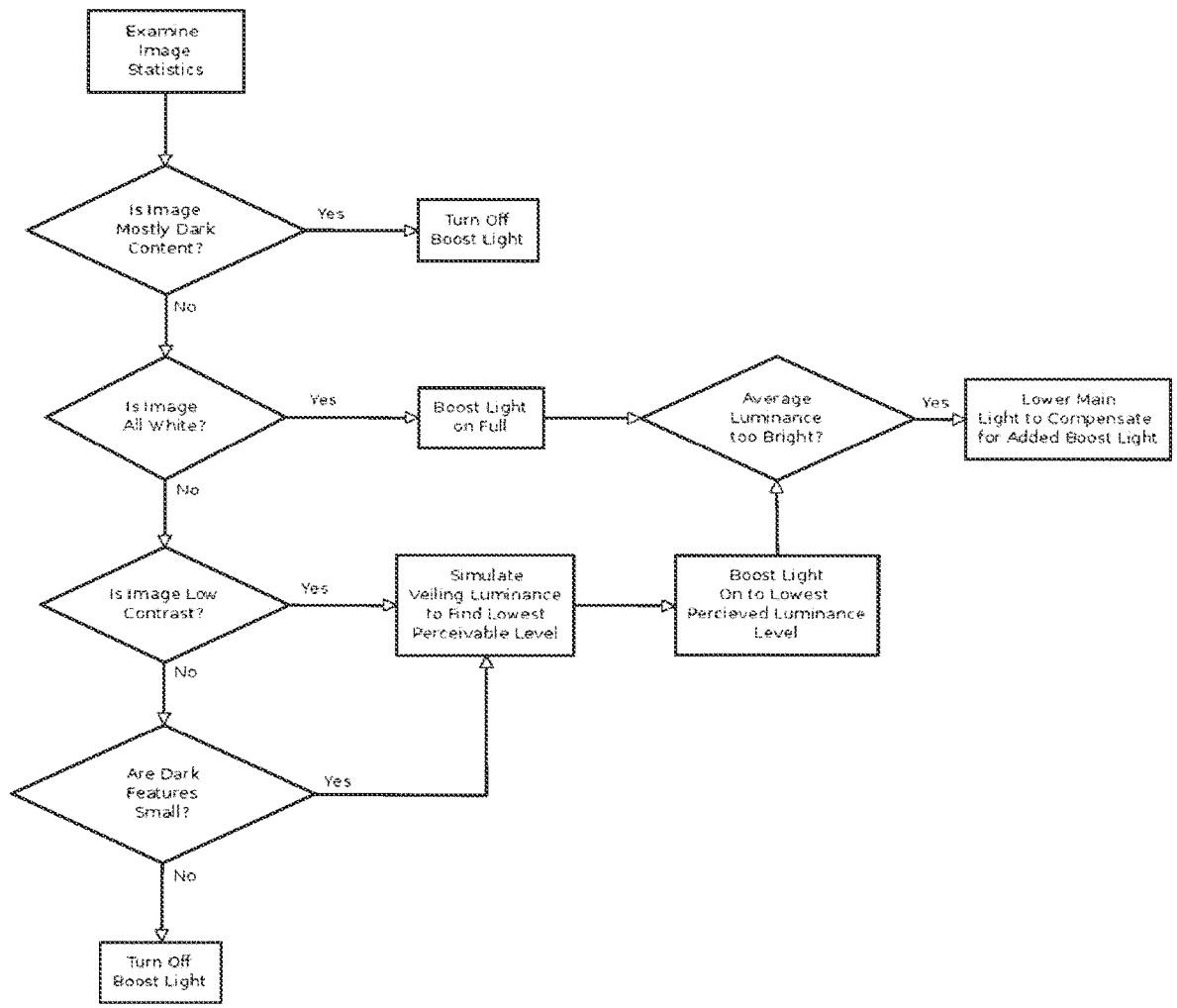
FIG. 15 is a flow chart illustrating how to control the light sources of a projection system with a main and an auxiliary (boost) light source.

FIG. 15 is a flow chart illustrating an intensity control method for the light sources in such a projection system. Such a method may be implemented in a controller for a display. In an alternative embodiment the method is implemented in an image processing system that provides output image data accompanied by control signals for light sources.

An algorithm is executed to govern the relative intensity settings of the two light sources. The boost light will be active when displaying low contrast imagery or when veiling luminance in the observer's eye or other optical scatter in the system or environment masks surrounding dark areas such that elevating the intensity of those dark areas does not result in noticeable degradation of the displayed image.

Image statistics, for example a histogram of the luminance distribution within an image, or other methods may be employed to determine the overall contrast requirements of the image. The boost light source may be used whenever possible as it is a more efficient light path than from the main light source and may always be used to provide brightness up to the darkest level present in an image.

The main light source may be dimmed to compensate for light being added to the image by the boost light source.

Figure 16:
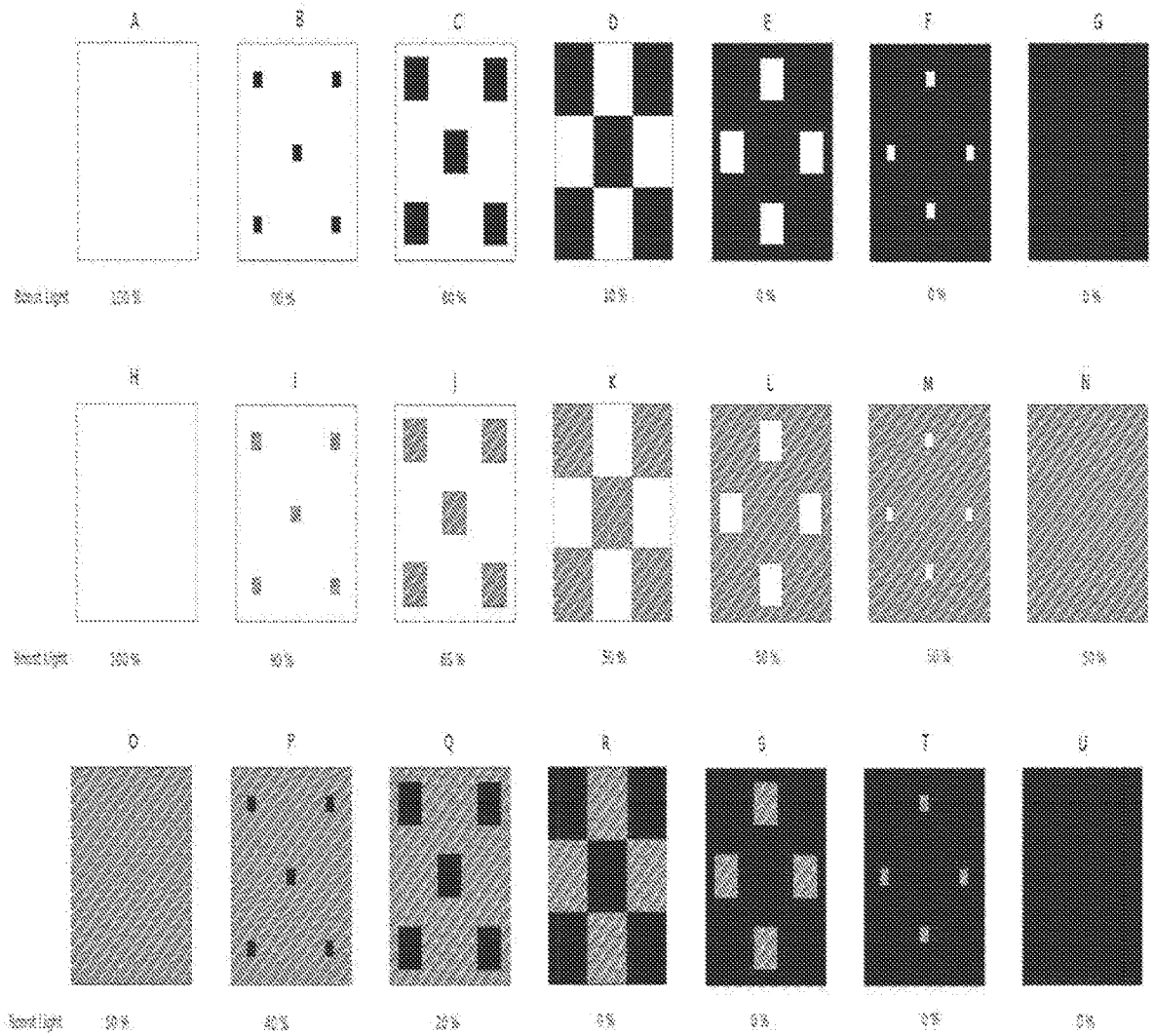
FIG. 16 illustrates example image data with different image characteristics and the corresponding intensity settings (control signals) for an auxiliary (boost) light source.

FIG. 16 illustrates example images with different characteristics such as peak luminance, mean luminance and black level as well as sensible intensity levels for a auxiliary (boost) light source.

Cases A and H show an image that is uniformly white at full intensity. In cases B, C, D, I, and J the boost light can drive higher than the lowest level due to veiling luminance effects. Cases P and Q are also affected by veiling luminance and allow some light to come from the boost light. In cases K, L, M, N, and O the boost light drives to the lowest brightness level present in the image. For example, the boost light may be provided at a level determined by multiplying the lowest luminance level in the image by a factor. The factor may be based on the contrast capability of the second modulator. For example if the lowest luminance level in a particular image is $L_{min}=1$ cd/m$^2$, and the contrast of the second modulator C2=2000:1, then the booster light may be provided with a luminance sufficient to achieve 2000 cd/m$^2$ with a fully open modulator C2 while allowing the light level to be reduced to 1 cd/m$^2$ by setting the second modulator to its least light-transmitting state.

In some embodiments, if a dark patch exceeds a threshold size such that it will not be masked by a veiling luminance effect, the boost light will be completely turned off and the non-black area of the screen will be illuminated through two image forming elements in series—drastically reducing the amount of light leaking through into the dark areas. In example cases E, F, G, R, S, T, and U there is enough dark content that the boost light is powered off to preserve the black levels.

It is not mandatory that the boost light and the main light source are distinct from one another. In some embodiments an optical system is provided that can direct some or all light from a main light source directly onto the last imaging element bypassing the first imaging element. For example, a variable beam splitter may be applied to divert some light from a main light source onto the last imaging element. Some embodiments have both a separate boost light source and a provision for diverting light from the main light source onto the last imaging element.

In some embodiments an optical element or elements are provided to combine light from the boost light source with light that has been modulated by the first imaging element and to direct the combined light onto the last imaging element. The optical element or elements comprises a prism in some embodiments.

In some embodiments the boost light source comprises a plurality of light sources such as a plurality of light-emitting diodes (LEDs). In one example embodiment the boost light source is arranged around an outer perimeter of the first imaging element. For example, the boost light source may comprise a ring of LEDs. Suitable reflectors, diffusers, spaces and/or other optical elements may be provided to cause light from the boost light source to be evenly distributed on the last imaging element.

FIGS. 2A to 6A show example images in five cases with different characteristics which are discussed above. The following explains by way of example how an auxiliary (booster) light source may be controlled for each of these 5 cases. In an example embodiment, the projector system used in the following examples may include a high efficient projector with steerable light source (main light source and first imaging element), a secondary imager and a booster stage that illuminates only the secondary imager. The secondary imager may, for example, comprise a reflective or transmissive spatial light modulator such as a LCD panel, LCOS, DMD, reflective LCD, or the like.

Case 1: Bright Low Dynamic Range Image, Elevated Black Levels

The boost stage is used to illuminate most of the image. The first, steering and high contrast stage is used to add minimal highlights to the image. Little steering is required.

Case 2: Dim Low Dynamic Range Image, High Blacks

The boost stage is used to illuminate the entire image. The steering stage is not used.

Case 3: Bright High Dynamic Range Image, High Blacks

The boost stage is full on. The steering stage is also full on providing maximum steering.

Case 4: Bright High Dynamic Range Image, Low Blacks

The boost stage is off. The image is created using the steering stage only.

Case 5: Dim Low Dynamic Range Image, Low Blacks

The boost stage in on, but at reduced intensity to preserve some of the black level in the image. The steering stage is off as no highlights are needed.

Technology as described herein may be applied, without limitation, to displays of the types described in U.S. patent application No. 61/893,270 filed Oct. 20, 2013 which is hereby incorporated herein by reference for all purposes.

Using a Combination of Projectors to Show Stereoscopic Content:

Systems of combined projectors or light sources, as described herein, lend themselves to applications that require the efficient or low cost or high brightness reproduction of 3D (stereoscopic) content.

Stereoscopic image pairs comprise an image intended for viewing with the right eye and an image intended for viewing with the left eye. The disparity of the images creates a depth effect. No disparity will render images perceived to be in the plane of the projection screen. A disparity between left and right eye images will render objects to be perceived away from the projection screen plane, either closer to the viewer (audience) or, if inverted further away (perceived to be behind the screen plane).

One characteristic of cinematic and other stereoscopic image content is that a pleasant viewing experience is more likely to be achieved if the disparity between left and right eye views is not too great (for example, depicted objects are not perceived as being too close to the viewer). The differences between the left and right eye views in stereoscopic image pairs are therefore typically kept small. Even in image pairs with depicted content that is perceived as being very close to the viewer (or very far away), many image areas in the left and right eye views will typically be the same because in almost all cases only some objects will be rendered as being close or far relative to the viewer.

Many, if not all, practical stereoscopic projection systems require filtering of light that is reflected off the projections screen before the light enters each eye of an observer. This filtering results in different images being delivered to viewers' left and right eyes. Filtering is often provided using eyeglasses which provide different filters for the left and right eyes. Common techniques use color filters (notch filters for some or all of the color primaries for the left and the right eye), circular or linear polarization filters, temporal shutters or temporal polarization switches.

Projection systems are set up to produce different images for the left and right eyes which have different corresponding (to the filter at right and left eye) light properties, for example narrow band primaries different for left and right eye view, or clockwise and counter-clockwise circularly polarized light, or light with orthogonal linear polarization states, or temporal light fields matching the temporal shutter at the eye or the polarization of the polarization switch.

All of these filtering techniques have in common that a large amount of light is lost between the light source of the projector and the observers' eye compared to similar non-stereoscopic projection systems. Stereoscopic projection systems are also more complex and thus more costly than non-stereoscopic projection systems. Another problem is that it is not always possible or easy to upgrade an existing non-stereoscopic projector to operate as a stereoscopic projector.

In a system as described herein, it is possible to use one projector in a non-stereoscopic mode with a light source that is compatible with both the left and the right eye filters (for example a broadband light source in the case of a system based on color notch filters, or a randomly polarized system in the case of either the circular or linearly polarized filter system or a permanently ON light source in case of any temporal shutter filtering system). The non-stereoscopic projector will create those parts of an image that are common to both the left and the right eye view.

A second projector (one or more projectors) may then be used to display the parts of the images that differ between the left and right eye views. The second projector projects light having the properties required for the left and the right eye filters (wavelength, or polarization, or temporal image fields).

There are several benefits in using such a system: compared to the system described herein, the additional cost to enable stereoscopic projection is minimal, because most of the components are already included in the architecture.

The power requirements for the second projector can be lower as the image regions with disparity between left and right are typically not large relative to all pixels of the image. Light steering may be used to steer light to the display areas corresponding to depicted objects perceived as being out of the plane of the display screen.

Creating good separation (=contrast) between the left and the right eye is not easy or costly. Less than perfect separation will result in some light intended for the right eye entering into the left eye. This effect is known as ghosting and reduces image quality and causes headaches. Since the second projector power requirements are lower than the main projector and the cost to make such a second projector is lower, more care can be taken to ensure that left and right eye views are truly separated.

A low power secondary projector can cost effectively be added to upgrade and enable an existing non-stereoscopic projection system to display stereoscopic images.

Power Output Relationship Between LDR/HDR Projectors:

With projector systems as described herein it should be possible to combine an LDR projector with for example 5× the power of the HDR projector. Since HDR projectors are far more expensive than LDR projectors this will allow for a more economical setup.

Non-Limiting Enumerated Example Embodiments

The following are non-limiting enumerated example embodiments.
1. A method for displaying an image defined by image data, the method comprising:
    generating first modulated light by modulating light from a first light source using a first imaging element;
    providing boost light;
    combining the boost light and the first modulated light; and
    further modulating the combined light using a second imaging element.
2. A method according to aspect 1 wherein combining the boost light and the first modulated light comprises illuminating a surface of the second imaging element with both the boost light and the first modulated light.
3. A method according to aspect 1 or 2 wherein combining the boost light and the first modulated light comprises directing the boost light and the first modulated light into a prism.
4. A method according to aspect 2 wherein the boost light evenly illuminates the surface of the second imaging element.
5. A method according to aspect 2 wherein the boost light is arranged to provide structured illumination to the surface of the second imaging element according to a desired luminance profile.
6. A method according to aspect 5 wherein the structured illumination has higher luminance on some parts of the surface of the second imaging element than it does in other parts of the surface of the second imaging element and the luminance of the highest luminance part of the structured illumination is at least twice a luminance of lowest luminance parts of the structured illumination.
7. A method according to any one of aspects 1 to 6 wherein operating the boost light source comprises controlling an output of light by the boost light source.
8. A method according to aspect 7 wherein controlling an output of light by the boost light source is based at least in part on a contrast of the image.
9. A method according to aspect 8 comprising determining the contrast of the image by processing an image histogram for the image.
10. A method according to any one of aspects 1 to 9 comprising dimming the first light source in combination with operating the boost light source.
11. A method according to any one of aspects 1 to 9 comprising processing the image data to identify any dark patches that exceed a threshold size and, in response to identifying the dark patches that exceed the threshold size, turning off the boost light source.
12. A method according to any one of aspects 1 to 11 wherein generating the boost light comprises operating a boost light source separate from the first light source.
13. A method according to any one of aspects 1 to 11 wherein generating the boost light comprises directing light from the first light source onto the second imaging element.
14. A method according to aspect 13 wherein directing light from the first light source onto the second imaging element comprises controlling a variable beam splitter.
15. A method according to aspect 13 wherein directing light from the first light source onto the second imaging element comprises delivering the light by way of an switch having one input port arranged to receive light from the first light source and two or more output ports, one of the output ports arranged to deliver the light to the second imaging element.
16. A method according to aspect 13 or 15 comprising adjusting the amount of boost light delivered to the second imaging element by time division multiplexing.
17. A method according to any one of aspects 1 to 16 comprising processing the image data to determine a lowest luminance level present in the image and operating the boost light source at a level corresponding to the lowest luminance level in the image.

18. A method according to any one of aspects 1 to 16 comprising processing the image data to simulate veiling luminance, determining a lowest perceptible luminance level present in the image and operating the boost light source at a level corresponding to the lowest perceptible luminance level.

19. A method according to any one of aspects 1 to 17 wherein the second imaging element comprises a spatial light modulator.

20. A method according to any one of aspects 1 to 17 wherein the second imaging element comprises a LCD panel, LCOS, reflective LCD panel, or DMD.

21. A method for generating signals for controlling a projector to display images according to image data, the projector comprising a first imaging element configured to provide modulated light to a second imaging element for further modulation by the second imaging element and a boost light configured to deliver additional illumination for modulation by the second imaging element, the method comprising: simulating veiling luminance to determine a lowest perceivable luminance level in the image and generating a signal to set the boost light at a level corresponding to the lowest perceptible luminance level.

22. A method according to aspect 21 comprising performing the step of simulating veiling luminance in response to the image data satisfying a condition.

23. A method according to aspect 22 comprising processing the image data to determine a contrast of the image wherein the condition comprises determining that the contrast is lower than a threshold value.

24. A method according to aspect 22 or 23 wherein the method comprises detecting any dark features in the image and the condition comprises determining that all of the dark features are smaller than a threshold size.

25. A method according to aspect 24 comprising, if any of the dark features are larger than the threshold size, generating a signal to set the boost light source to be off.

26. A method according to any one of aspects 21 to 23 comprising processing the image data to detect dark features in the image data, the method comprising, if any of the dark features are larger than the threshold size, generating a signal to set the boost light source to be off.

27. A method according to any one of aspects 21 to 26 comprising processing the image data to determine an amount of the image that is dark and, if the image is predominantly dark, generating a signal to set the boost light source to be off.

28. A method according to any one of aspects 21 to 27 comprising generating the signal to set the boost light at a level corresponding to the lowest perceptible luminance level in combination with generating a signal to reduce a level of a main light source illuminating the first imaging element.

29. A method according to any one of aspects 21 to 27 performed by a controller in the projector.

30. A method according to any one of aspects 21 to 27 performed by an image processing system configured to provide output image data accompanied by control signals for the boost light.

31. A method according to any one of aspects 21 to 30 wherein the boost light uniformly illuminates the second modulator.

32. A method according to any one of aspects 21 to 30 wherein the boost light non-uniformly illuminates the second modulator.

33. A light projector comprising:
a first imaging element configured to provide modulated light to a second imaging element for further modulation by the second imaging element and a boost light configured to deliver to the second imaging element illumination for modulation by the second imaging element.

34. A light projector according to aspect 33 wherein the first imaging element is configured to modulate one or both of the phase and amplitude of light from a main light source.

35. A light projector according to aspect 33 or 34 wherein the boost light is separate from the main light source.

36. A light projector according to aspect 35 wherein the boost light comprises a plurality of light sources.

37. A light projector according to aspect 35 wherein the plurality of light sources of the boost light comprises a plurality of light emitting diodes (LEDs).

38. A light projector according to aspect 35 wherein the plurality of light sources of the boost light comprises a plurality of laser diodes.

39. A light projector according to any one of aspects 36 to 38 wherein the plurality of light sources of the boost light are arranged around an outer perimeter of the first imaging element.

40. A light projector according to any one of aspects 36 to 39 wherein the light sources of the boost light are arranged in a ring.

41. A light projector according to any one of aspects 36 to 40 wherein the light sources of the boost light are individually controllable to yield a desired pattern of boost light on the second imaging element.

42. A light projector according to any one of aspects 33 to 34 wherein the boost light comprises an optical system configured to direct light from the main light source directly onto the second imaging element.

43. A light projector according to aspect 42 wherein the optical system comprises a variable beam splitter.

44. A light projector according to any one of aspects 33 to 43 comprising a controller configured to process the image data and to output control signals for the first and second imaging elements and the boost light.

45. A light projector according to aspect 44 wherein the controller is configured to simulate veiling luminance to determine a lowest perceivable luminance level in the image and set the boost light at a level corresponding to the lowest perceptible luminance level.

46. A light projector according to aspect 45 wherein the controller is configured to perform the step of simulating veiling luminance in response to the image data satisfying a condition.

47. A light projector according to aspect 46 wherein the controller is configured to process the image data to determine a contrast of the image wherein the condition comprises determining that the contrast is lower than a threshold value.

48. A light projector according to aspect 46 or 47 wherein the controller is configured to detect any dark features in the image and the condition comprises determining that all of the dark features are smaller than a threshold size.

49. A light projector according to aspect 48 wherein the controller is configured to, if any of the dark features are larger than the threshold size, set the boost light source to be off.
50. A light projector according to any one of aspects 47 to 49 wherein the controller is configured to process the image data to detect dark features in the image data, and, if any of the dark features are larger than the threshold size, set the boost light source to be off.
51. A light projector according to any one of aspects 47 to 50 wherein the controller is configured to process the image data to determine an amount of the image that is dark and, if the image is predominantly dark, set the boost light source to be off.
52. A light projector according to any one of aspects 47 to 51 wherein the controller is configured to set the boost light at a level corresponding to the lowest perceptible luminance level in combination with reducing a level of illumination of the first imaging element.
53. A light projector according to any one of aspects 33 to 52 wherein the second imaging element comprises a spatial light modulator.
54. A light projector according to any one of aspects 33 to 52 wherein the second imaging element comprises a LCD panel. LCOS, reflective LCD panel, or DMD.
55. A light projection method comprising controlling a plurality of imaging stages arranged in series to produce modulated light and selectively adding light before a final one of the imaging stages when low black levels are not required.
56. A light projection method according to aspect 55 comprising processing image data to determine a contrast of an image represented by the image data, the method comprising adding the light when the contrast is below a threshold value.
57. A light projection method according to aspect 56 comprising determining the contrast by processing an image histogram.
58. A light projection method according to any one of aspects 55 to 57 comprising uniformly distributing the added light at the final one of the imaging stages.
59. A light projection method according to any one of aspects 55 to 58 wherein controlling the plurality of imaging stages comprises controlling the imaging stages to modulate one or more of the phase and amplitude of light incident on the imaging stage.
60. A light projection method according to any one of aspects 55 to 59 comprising varying the amount of added light based on data defining an image to be projected.
61. A light projection method according to any one of aspects 55 to 57 comprising non-uniformly distributing the added light at the final one of the imaging stages.
62. A light projection method according to aspect 61 comprising structuring the added light such that the added light summed with artifacts from earlier imaging stages yield uniform illumination of the final one of the imaging stages.
63. A light projector comprising:
    a first imaging stage arranged to modulate light from a main light source;
    a second imaging stage arranged to further modulate light modulated by the first imaging element; and
    a boost light arranged to add light after the first imaging stage and before the second imaging stage such that the added light is modulated by the second imaging stage; and
    a controller operative to process image data and to operate the boost light when low black levels are not required.
64. A light projector according to aspect 63 wherein the controller is configured to process the image data to determine a contrast of an image represented by the image data and to operate the booster light to add light when the contrast is below a threshold value.
65. A light projector according to aspect 64 wherein the controller is configured to determine the contrast by processing an image histogram.
66. A light projector according to any one of aspects 63 to 65 wherein the booster light is arranged to evenly illuminate the second imaging stage.
67. A light projector according to any one of aspects 63 to 65 wherein the first imaging stage is controllable to modulate one or more of the phase and amplitude of light incident on the first imaging stage.
68. A light projector according to any one of aspects 63 to 67 wherein the controller is configured to vary the amount of light added by the booster light based on the image data.
69. A method for projecting a light pattern defined by image data, the method comprising:
    generating first modulated light by modulating light from a first light source using a first imaging element;
    providing boost light;
    further modulating the first modulated light and modulating the boost light;
and
    combining the modulated boost light and the further modulated first modulated light.
70. A method according to aspect 69 wherein combining the modulated boost light and the further modulated first modulated light comprises projecting the modulated boost light and the further modulated first modulated light onto a surface.
71. A method according to aspect 69 or 70 wherein the modulated boost light has a higher black level than the further modulated first modulated light.
72. A method according to any one of aspects 69 to 71 wherein the modulated boost light has a higher peak luminance than the further modulated first modulated light.
73. A method according to any one of aspects 69 to 72 wherein the modulated boost light has a lower dynamic range than the further modulated first modulated light.
74. A method according to any one of aspects 69 to 73 wherein further modulating the first modulated light and modulating the boost light are both performed with a second imaging element.
75. A method according to any one of aspects 69 to 74 wherein further modulating the first modulated light and modulating the boost light both apply the same modulation.
76. A method according to aspect 75 comprising evenly illuminating a surface of the second imaging element with the boost light.
77. A method according to any one of aspects 69 to 76 wherein providing the boost light comprises controlling an output of light by a boost light source.
78. A method according to aspect 77 wherein controlling an output of light by the boost light source is based at least in part on a contrast of the image data.

79. A method according to aspect 78 comprising determining the contrast of the image data by processing an image histogram for the image data.
80. A method according to any one of aspects 69 to 79 comprising dimming the first modulated light in combination with providing the boost light.
81. A method according to any one of aspects 69 to 80 comprising processing the image data to identify any dark patches that exceed a threshold size and, in response to identifying the dark patches that exceed the threshold size, turning off the boost light.
82. A method according to aspect 75 comprising non-evenly illuminating a surface of the second imaging element with the boost light.
83. A method according to any one of aspects 69 to 82 wherein providing the boost light comprises operating a boost light source separate from the first light source.
84. A method according to any one of aspects 69 to 82 wherein providing the boost light comprises directing light from the first light source onto a second light modulator.
85. A method according to aspect 84 wherein directing light from the first light source onto the second light modulator comprises controlling a variable beam splitter.
86. A method according to any one of aspects 69 to 85 comprising processing the image data to determine a lowest luminance level present and providing the boost light at a level corresponding to the lowest luminance level.
87. A method according to any one of aspects 69 to 85 comprising processing the image data to simulate veiling luminance, determining a lowest perceptible luminance level present in the image and providing the boost light at a level corresponding to the lowest perceptible luminance level.
88. A projector system comprising a plurality of projectors, the plurality of projectors comprising at least a first projector and a second projector arranged such that light projected by the first and second projectors is combined into a projected image for viewing wherein the first and second projector have different imaging characteristics selected from: dynamic range, black level and peak luminance.
89. A projector system according to aspect 88 comprising a control system connected to receive image data defining image content to be projected by the projector system and to control the projector system to project the image content
wherein the control system is configured to process the image data and to generate modified image data for projection by at least one of the first and second projectors.
90. A projector system according to aspect 89 wherein the control system is configured to process the image data to determine dynamic range, black levels and average luminance level and to generate the modified image data based on the dynamic range, black levels and maximum luminance level.
91. A projector system according to aspect 90 wherein the first projector has a higher dynamic range, higher peak luminance and lower black level than the second projector.
92. A projector system according to aspect 91 wherein, in the case where the image data has luminance in higher luminance areas greater than a maximum luminance of the second projector the control system controls the luminance threshold to cause the first projector to project light in at least the higher luminance areas.
93. A projector system according to aspect 92 wherein, in the case where black levels are above a black level threshold, the control system is configured to control the second projector to project as much light of the image as is within the capability of the second projector.
94. A projector system according to any one of aspects 91 to 93 wherein the control system is configured to generate the modified image data for the first projector by a method comprising creating a binary mask of pixels having luminances above the full-screen white value of the second projector.
95. A projector system according to aspect 94 wherein the control system is configured to dilate and blur the binary mask.
96. A projector system according to any one of aspects 91 to 95 wherein the control system is configured to generate the modified image data for the second projector by a method comprising clipping luminance of pixels in the image data having luminance values above the full-screen white value of the second projector.
97. A projector system according to any one of aspects 89 to 96 wherein the control system is configured to supply the image data to the second projector unmodified in the case where the dynamic range, black levels and average luminance level are within the capabilities of the second projector.
98. A projector system according to any one of aspects 89 to 97 wherein the second projector comprises a controllable iris and the control system is configured to control the iris to reduce a black level of the second projector in at least some cases where the black level of the image data is below a black level of the second projector.
99. A projector system according to any one of aspects 89 to 98 wherein the control system comprises an image formation model for the projector system and the control system is configured to obtain values of control parameters for the first and second projectors by performing an optimization.
100. A projector system according to aspect 99 wherein performing the optimization comprises minimizing a sum of cost functions.
101. A projector system according to aspect 100 wherein the cost functions include cost functions relating to image fidelity, image quality and system constraints.
102. A projector system according to aspect 101 wherein the cost function relating to image fidelity comprises a mean squared error value or a mean absolute error value.
103. A projector system according to aspect 101 or 102 wherein the cost function relating to image quality comprises one or more heuristics indicating how preferable a current set of control parameters is in relation to artifacts not modelled by the image formation model.
104. A projector system according to aspect 103 wherein the heuristics comprise heuristics for one or more of moire, color fringing and diffraction artifacts.
105. A projector system according to any one of aspects 101 to 104 wherein the constraints limit the values of the control parameters to parameters that are physically realizable.
106. A projector system according to any one of aspects 99 to 105 wherein the control system is configured to attempt to achieve a desired ratio of total light output of the first and second projectors.
107. A projector system according to any one of aspects 99 to 105 wherein the control system is biased to control one of the first and second projectors to contribute as much light to the projected image as it is capable of.
108. A projector system according to any one of aspects 99 to 107 wherein the image formation model includes a heuristic scattering model.
109. A projector system according to any one of aspects 89 to 108 wherein the first and second projectors have different primary colors and the controller is configured to balance light output by the first and second projectors to achieve colours in the projected image that are outside of a gamut of at least one of the first and second projectors.
110. A projector system according to any one of aspects 89 to 109 wherein the controller is configured to balance light output by the first and second projectors to achieve an optimized reproduction of high-spatial frequency features in image content of the projected image.
111. A projector system according to any one of aspects 89 to 110 wherein the control parameters include pixel values for the first and second projectors.
112. A projector system according to any one of aspects 89 to 111 wherein the control parameters include light source values for the first and second projectors.
113. A projector system according to any one of aspects 89 to 112 wherein the control system is configured to take into account ambient light in an area of the projected image.
114. Methods or apparatus according to any one of the above aspects applied to project light in a vehicle headlight.
115. Methods and apparatus according to any one of the above aspects involving combining light projected from a 2D projector with light containing a stereoscopic image pair projected by one or more other projectors wherein left-eye and right-eye images of the stereoscopic image pair are distinguishable from one another in one or both of time and distinguishable light characteristics and the light projected by the 2D projector comprises light matching both of the left and right-eye images.
116. Apparatus having any new and inventive feature, combination of features, or sub-combination of features as described herein.
117. Methods having any new and inventive steps, acts, combination of steps and/or acts or sub-combination of steps and/or acts as described herein.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, display, iris, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for generating signals for controlling a projector to display images according to image data, the projector comprising a first imaging element configured to provide modulated light to a second imaging element for further modulation by the second imaging element and a boost light configured to deliver additional illumination for modulation by the second imaging element, the method comprising:
    determining black levels of the images;
    simulating veiling luminance to determine a lowest perceivable luminance level in the image; and
    generating a signal, based on the determined black levels of the image, to supply highlights in the displayed images that have brightness greater than a peak brightness achievable by the first imaging element and to set the boost light at a level corresponding to the lowest perceptible luminance level.

2. The method according to claim 1 comprising performing the step of simulating veiling luminance in response to the image data satisfying a condition.

3. The method according to claim 2 comprising processing the image data to determine a contrast of the image wherein the condition comprises determining that the contrast is lower than a threshold value.

4. The method according to claim 2 wherein the method comprises detecting any dark features in the image and the condition comprises determining that all of the dark features are smaller than a threshold size.

5. The method according to claim 4 comprising, if any of the dark features are larger than the threshold size, generating a signal to set the boost light source to be off.

6. The method according to claim 1 comprising processing the image data to detect dark features in the image data, the method comprising, if any of the dark features are larger than the threshold size, generating a signal to set the boost light source to be off.

7. The method according to claim 1 comprising processing the image data to determine an amount of the image that is dark and, if the image is predominantly dark, generating a signal to set the boost light source to be off.

8. The method according to claim 1 comprising generating the signal to set the boost light at a level corresponding to the lowest perceptible luminance level in combination with generating a signal to reduce a level of a main light source illuminating the first imaging element.

9. The method according to claim 1 performed by a controller in the projector.

10. The method according to claim 1 performed by an image processing system configured to provide output image data accompanied by control signals for the boost light.

11. The method according to claim 1 wherein the boost light uniformly illuminates the second modulator.

12. The method according to claim 1 wherein the boost light non-uniformly illuminates the second modulator.

* * * * *